(12) United States Patent
Blanchard et al.

(10) Patent No.: US 7,420,505 B2
(45) Date of Patent: Sep. 2, 2008

(54) RADAR OR SENSOR SYSTEM WITH HIERARCHICAL ARCHITECTURE AND RECONFIGURABLE FUNCTIONALITY

(75) Inventors: Andrew Blanchard, Murphy, TX (US); Jeffry Golden, Creve Coeur, MO (US); Robert D. Morgan, Chesterfield, MO (US); Andrew Cilia, Dallas, TX (US)

(73) Assignee: Clean Earth Technologies, LLC, St. Louis, MO (US)

( * ) Notice: Subject to any disclaimer, the term of this patent is extended or adjusted under 35 U.S.C. 154(b) by 842 days.

(21) Appl. No.: 10/855,447

(22) Filed: May 27, 2004

(65) Prior Publication Data

US 2008/0088502 A1 Apr. 17, 2008

Related U.S. Application Data

(60) Provisional application No. 60/473,512, filed on May 27, 2003.

(51) Int. Cl.
*G01S 13/86* (2006.01)
(52) U.S. Cl. ...................................... 342/195
(58) Field of Classification Search .................. 342/195
See application file for complete search history.

(56) References Cited

U.S. PATENT DOCUMENTS

| 5,719,582 | A | 2/1998 | Gray | 342/120 |
|---|---|---|---|---|
| 6,031,485 | A | 2/2000 | Cellai | 342/131 |
| 6,191,725 | B1 | 2/2001 | Lavoie | 342/92 |
| 6,260,052 | B1 | 7/2001 | Song | 708/300 |
| 6,317,467 | B1 | 11/2001 | Cox et al. | 375/267 |
| 6,545,635 | B2 | 4/2003 | Gaentgen | 342/195 |
| 6,557,114 | B2 | 4/2003 | Mann et al. | 714/6 |
| 6,952,688 | B1 * | 10/2005 | Goldman et al. | 706/45 |
| 2002/0150866 | A1 * | 10/2002 | Perry et al. | 434/62 |
| 2005/0235289 | A1 * | 10/2005 | Barillari et al. | 718/100 |

FOREIGN PATENT DOCUMENTS

WO    WO 2004106965 A2 * 12/2004

OTHER PUBLICATIONS

Skolnik, M., *Introduction to Radar Systems*, McGraw-Hill Book Co., NY, NY 1962, pp. 36-67, 365-388.
Nathanson, F.E., *Radar Design Principles*, McGraw-Hill Book Co., NY, NY 1969, pp. 276-317.
Ulaby, F., Moore, R., Fung, A., *Microwave Remote Sensing, Active and Passive*: vol. I and II, Artech House, Dedham, MA 1982 pp. 99-613.

* cited by examiner

*Primary Examiner*—Dan Pihulic
(74) *Attorney, Agent, or Firm*—Kang Intellectual Property Law, LLC; Grant D. Kang

(57) ABSTRACT

A method of organizing a radar system or a sensor system with multiple levels of hierarchical constructs for all level of the system. These architectural levels incorporate self-similar organizational structure and represent design strategies that implement data transfer and communication interfaces with both intranet and internet communication network connections.

8 Claims, 24 Drawing Sheets

RADAR OR SENSOR SYSTEM WITH HIERARCHICAL ARCHITECTURE AND RECONFIGURABLE FUNCTIONALITY

CROSS-REFERENCE TO RELATED APPLICATIONS

This application claims priority to U.S. application No. 60/473,512 filed on May 27, 2003.

STATEMENT REGARDING FEDERALLY SPONSORED RESEARCH OR DEVELOPMENT

The United States Government has rights in this invention pursuant to Contract No. DASG60-02-C-0015 with the United States Department of Army Space and Missile Defense Command in which the University of Missouri-Columbia was the prime contractor.

APPENDIX

Not applicable.

FIELD OF THE INVENTION

This invention relates to radar or sensor system design and implementation, in particular, the methods and implementation of an advanced mostly-digital radar system that has a hierarchical organization, which comprises a system architecture of multiple layers and uses communication networks within the system structure to allow system reconfiguration for desired functions and performance characteristics.

BACKGROUND OF THE INVENTION

Generally, improvements in radar system configurations have focused on performance characteristics such as greater range, higher efficiency, or new functional modes and capabilities. Over most of the history of radar, typical examples of such improvements have been better power management, greater effective radiated power, lower noise, greater stability, or specialized modulation and beam forming techniques. Additionally component integration (such as MIMIC devices and integrated T/R modules) and miniaturization of mechanical and electronic components within the system have improved system reliability and performance. However, system configurations and integrated system architectures have typically remained the same over many system generations—a by-product of an evolutionary design approach.

More recently, as digital technology has developed, software control and software radar receivers have enabled dynamic reconfigurability and more flexible, computationally intensive data analysis. Conversion of traditional analog implementation structure to digital devices and radar implementations have led to software selectable operation modes, e.g., target detection, target tracking (Track), moving target indicator (MTI), and others. Furthermore, the migration from entirely analog to mostly digital systems has made possible complex modes of operation such as synthetic aperture imaging (SAR) and other computationally intensive radar applications.

The advent of affordable, large scale, fast computer data management, embedded digital signal processors (DSPs), and affordable, fast data storage has spawned new concepts in data transfer and data processing for radar systems. An example of such a radar system organization is the 'scalable radar signal processing system' described by R. Gaentgen, (U.S. Pat. No. 6,545,635, issued Apr. 8, 2003), wherein one or more digital signal processing units are connected in a parallel fashion to an information transfer bus. Furthermore, organizational structures have been developed for computers, mass data storage, and for networks of computers and storage devices that effect data transfer rates in the gigabit per second (Gbps) range, multiple user accessible storage area networks, and computer clusters. These have direct applicability to radar systems that employ digital processing and 'software receivers'. An example of such a computer development is the 'loosely coupled mass storage computer cluster' described by B. E. Mann et al. (U.S. Pat. No. 6,557,114, issued Apr. 29, 2003). Still further, networks of computers, sensors, and instruments are well known, e.g., the internet concept, as is the use of a network within a localized system embodied as an intranet or as a parallel bus structure.

In the prior art for radar systems, computer systems, and networks, however, each system comprises subsystem units that are relatively complex, multi-component assemblies, and these subunits are connected as subordinate clients on a data transfer system. Although some of these subunits may have their own embedded processors and data storage, it has not been recognized that each subunit may be organized as a structure that has similarity with the overall system and also, that its subunits may also be organized as such similar units. This kind of multi-layered system organization is referred to as 'self-similar' because the overall system and its individual layers share a similar organizational structure. The ranking of subordinate layers of system subunits is called a 'hierarchical' scheme. Because of the ranking, the layers are also referred to as levels. The uppermost level can be assigned to the overall system, the global level. The lowest level can be assigned to the 'component' or 'device' level.

SUMMARY OF THE INVENTION

Overall radar system architecture (as well as most sensor system architectures) is a hierarchical organization with global system infrastructure at the highest level and individual component functionality at the lowest level. In this scheme, units at each layer may typically comprise five elements or groups of parts: command, control, communication, and computational (or processing) networks (referred to as 'C4 networks') that are coupled by a level-associated intranet C4 infrastructure (C4 plus infrastructure is termed "C4I") to external input/output (I/O) transactions for information transfer, e.g., data signals and control signals. Implementation of each level is embodied by logical functions, software programs, and physical hardware.

The functions of the five elements are broadly defined. Command means to order or direct the various operations of the system. Control means to operate or regulate the actions of the system. Communicate means to exchange information, e.g., signals, data, commands, etc. Computational means pertaining to the act of computing or calculating; herein it also means data processing. Infrastructure is the substructure or underlying foundation of groups of parts, modules and components that enact various functions of the system or its parts. This may include input and output information transfers, analog sensor operation, e.g., the analog front end of the radar system receiver, analog output operation, e.g., the radar transmitter, or system support or maintenance functions. These functions may be software or hardware embodiments as necessary for a specific task or situation.

The hierarchical scheme for a radar (or sensor) system comprising the invention may be applied as a general organizational principle to any complex sensor system of which a radar system is a specific example. In this scheme, the radar system may be either an active (radiating) radar system or a passive radar system. One of the benefits of the scheme is that the system may be reconfigured for a variety of functions and that new capabilities may be achieved; as examples, beam forming in a phased array radar may be obtained within an individual pulse; complex pulse modulation encoding may be obtained on a pulse-to-pulse basis. Reconfigurability may be the dynamic change from one radar operational mode to another, e.g., from a moving target indicator to a synthetic aperture radar imager. It may also be a change in the operating characteristics of a single operational mode, e.g., a change in the resolution, gate thresholds, or filtering characteristics. The scheme may have the additional benefits of scalability and allow for modular construction and module replacement or upgrading.

The invention and objects and features thereof will be more readily apparent from the following detailed description and appended claims when taken with the drawings. The component level architecture will have the same general organizational structure as the higher level components of the system architecture. Network, storage, memory, computational, communication and control components are all represented, with the addition of analog interfaces for analog (in the specific case of the RADAR RF) inputs and outputs. Key representations illustrate the hierarchical nature of the system design and architectural structure. Although components are critical to overall implementation, the architectural structure allows flexibility in achievable performance, scalability for future performance improvements and resilient design minimizing architectural changes in future system implementations.

As a specific example we describe the elements of a RADAR system, however these concepts are applicable to any sensor or communication system where these methodologies have appropriateness. Major components critical to the RF front-end implementation include, ADC modules, RF front end modules, AGC modules, LNA modules, and pulse modulator/demodulator modules. Each of the component modules are described in the following paragraphs and illustrate the concepts described in detail in the following paragraphs.

DETAILED DESCRIPTION OF THE INVENTION

Figure 1:
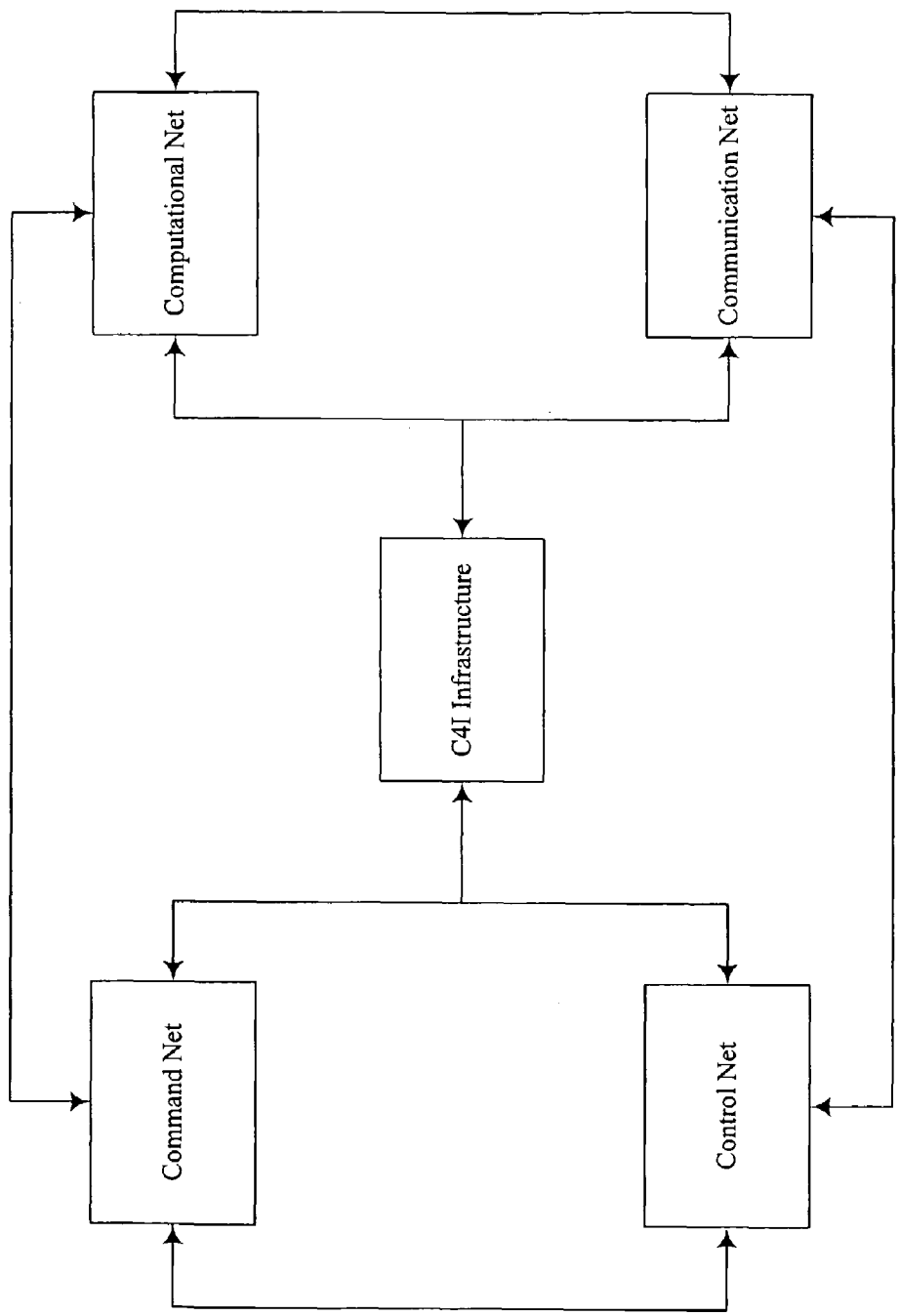
FIG. 1: This figure describes the overall architecture of the radar system. The interconnection between the major components of the C4I infrastructure, are interlaced within the sensor network. This figure represents the high level architecture of the system, i.e., the global level, and comprises the integrated command, control, communication and computation networks and the C4I infrastructure. The communication infrastructure can take the form of all conventional and future communication schemes including wired, wireless, optical, RF etc.

FIG. 1 illustrates the upper level architecture. It is in this level that system configuration and operational mode is most generally defined and managed. Typically the infrastructure supports the global interfaces of the overall system for external system clients, e.g., providing intelligence, surveillance, and reconnaissance (ISR) data products to network centric users or clients for battlefield management. Bandwidth requirements at a given level or in communication with layers above or below may span the range of very low to extremely high. Generally, system control requirements tend to utilize low bandwidth and information or data transport require high bandwidth conduits. The network components are inherently distributed. Computation components will not reside only in one location, and in some case may be distributed with sensor components as well as computational engines localized at command central. The approach configures resources to optimize functional requirements, information generation, information transfer, system control and configuration, and the allocation of communication resources based on Quality of Service (QoS) requirements and hierarchy. This particular infrastructure will utilize current and future generations of communication interfaces such as distributed fixed based wireless systems, 3 and 4 G wireless constructs, optical and legacy wired infrastructures, etc.

Figure 2:
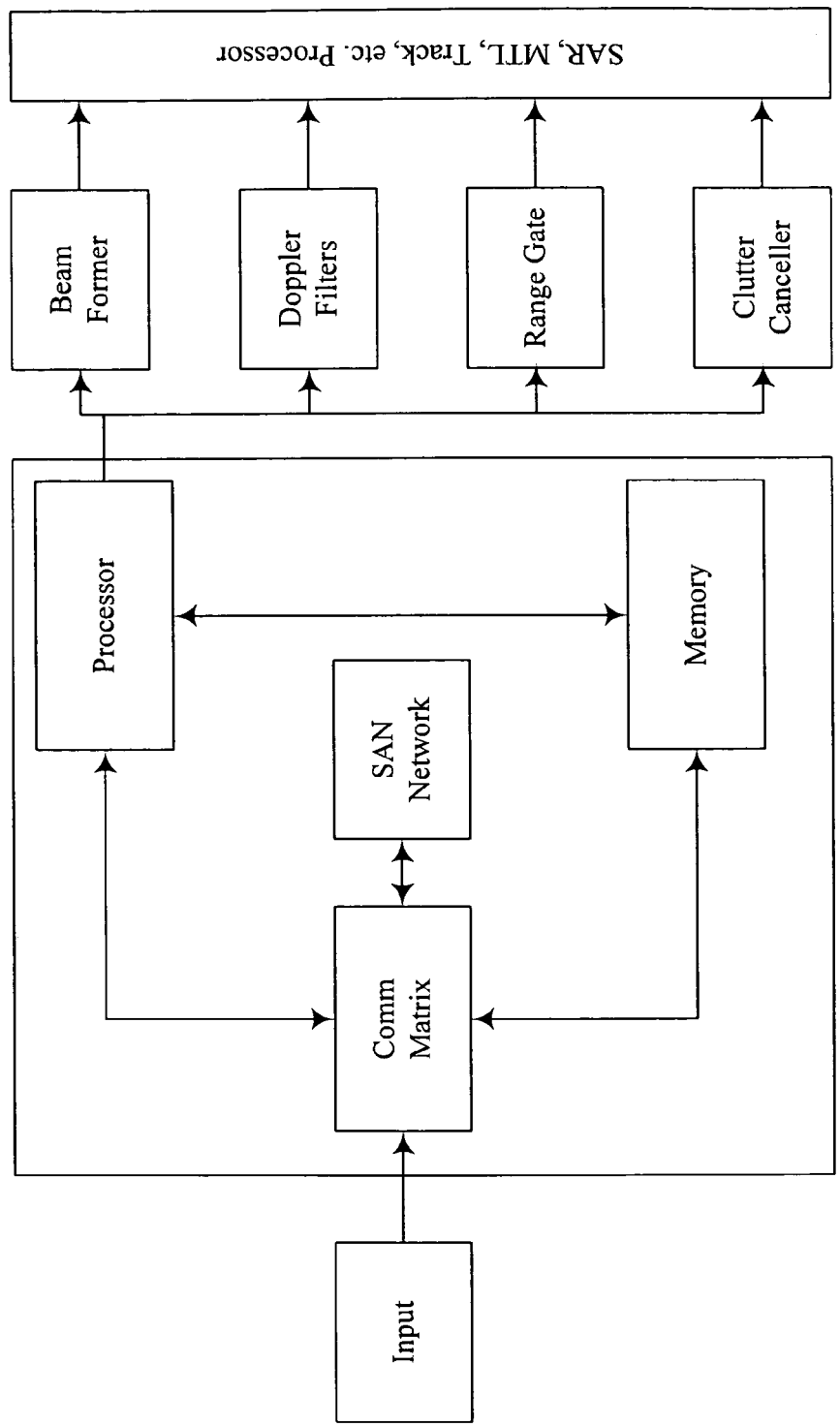
FIG. 2: This figure represents the organization and implementation of the functional modality of the radar. Inputs from the individual parts of the radar as an example of a generic sensor are used to calculate the output requirements of the sensor. In this fashion, the radar (sensor) operational configuration is synthesized using an appropriate processor and software. Changes in sensor modality are incorporated by modifying software and sensor inputs. Communication, control, command and computational interfaces are similar, i.e., analogous, to those of FIG. 1 (this is called the concept of self-similarity). The overall architecture is consistent by self-similarity with the other (subordinate) levels in that it comprises communication channels connecting computational, memory, control, and infrastructure networks (subunits such as modules or devices) to produce functionality.

The midlevel architecture is shown in FIG. 2. This level of the system describes system functionality rather than configuration. In the example shown in the figure, the I/O infrastructure is represented as 'input' and parallel outputs to the 'SAR, MTI, Track, etc. processor'. Control, communication, and processor are shown integrated with a SAN, and the processor is coupled to subunits that comprise specific functional modules at the next lower level.

Once the incoming signal has been digitized, a network of distributed communication and processing hardware and software produces the required transformations. Since this portion of the architecture is mostly communication and processor driven, progressive system upgrades can be included in the architecture design. Requirements at this level may include reconfigurability, resiliency, distributed computational interfaces, computational redundancy and self organization/healing. This architectural level will have interfaces to the upper level and lower level architectural structure. C4I interfaces will include traditional low bandwidth conduits and extremely high bandwidth infrastructure typically at the interface to hardware processors that are required to implement functionality.

Figure 3:
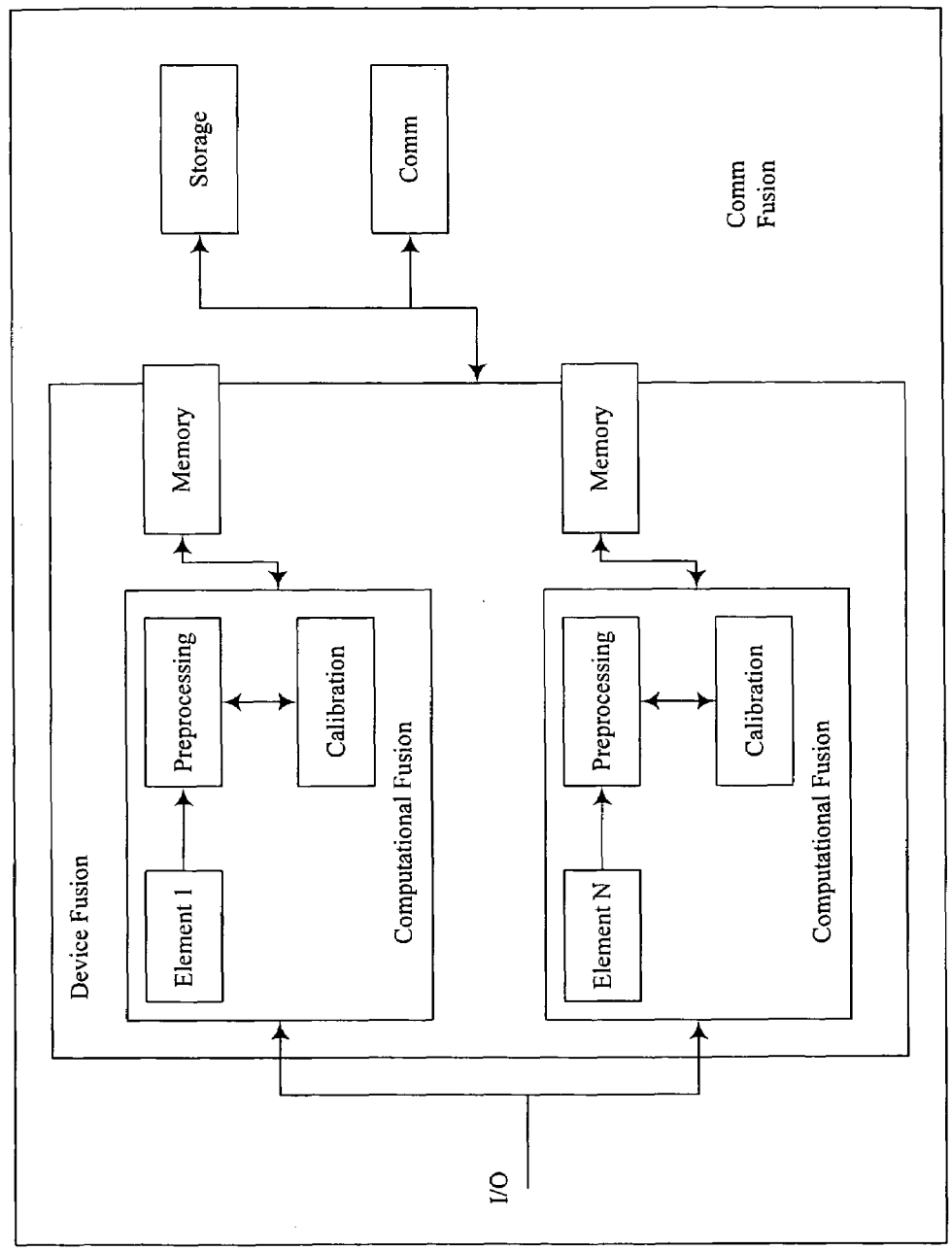
FIG. 3: This figure represents a lower level in the overall architecture of the radar (sensor) system. This level provides integration of several individual components that make up typical radar (sensor) systems (e.g., individual antenna elements, etc). This device integration configures individual inputs or outputs of the system that are used to form the input to the mid level architecture (described in FIG. 2). Components include computational, storage, memory, command, control, and communications infrastructure in a manner similar to the previously described levels.

The next level of architecture is the lower level shown in FIG. 3. This level may comprise the set of functional modules. The integration of device, communication and computational resources are included in this lower level descriptor. This level is dominated by high band width communication interfaces that support both processor functionality and communication interfaces. This connectivity takes the form of conventional communications architecture as well as buss-oriented architectures associated with memory and storage interfaces. In some cases, memory and computational resources are shared between devices, communications interfaces and computational structures. This level specifies the fusion between compute, communicate and the individual devices that make up higher level components (e.g. automatic gain control: AGC's, low noise amplifiers: LNA's, analog-digital converters: ADC's, etc.). Each antenna element has a transceiver pair that is constructed from individual components each of which have compute, communicate and control structures.

Figure 4:
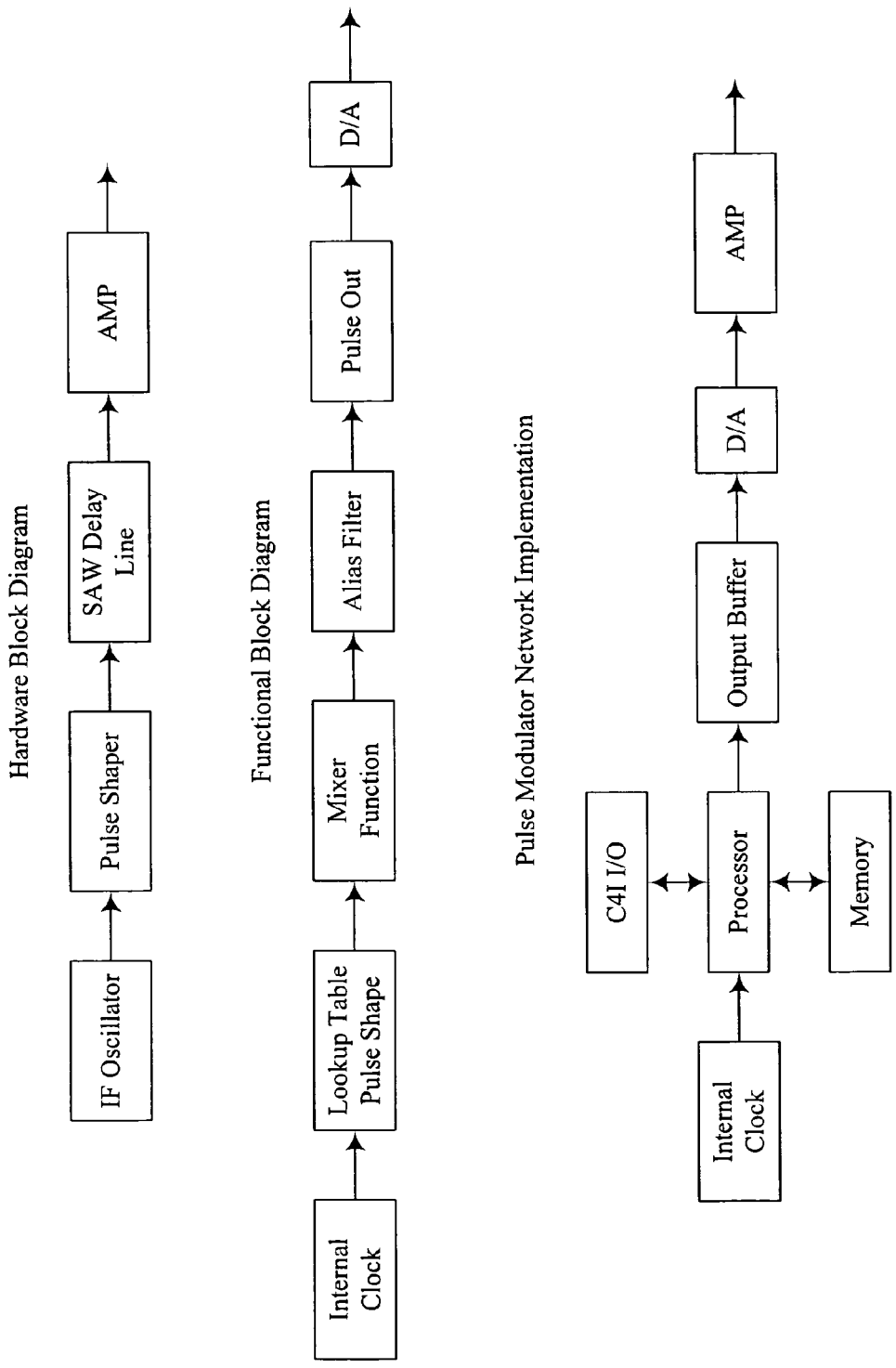
FIG. 4: This figure describes the architecture of individual components of the sensor system. The components are implemented using computational devices and software. The functional behavior of the components can be changed by reprogramming the computational devices. This capability is illustrated by describing the architecture of a pulse modulator network, however, this approach is applicable to all component level devices with the sensor architecture.

The device structures are described as block diagrams in FIG. 4. Shown is an example of advanced integrated devices that share a common C4I architecture. The upper diagram represents the analog hardware for a pulse modulator, the middle diagram is a functional block diagram for a 'software' pulse modulator, and the lower diagram is the pulse modulator network implementation in the self-similar hierarchical scheme. In analog radars, the pulse shaper is a hardware-implemented device with limited flexibility. In the example, the pulse shape is tied to the surface acoustic wave (SAW) device. The output signal is dictated by the set of design specifications describing the overall structure. System flexibility is severely limited because of the hardware implementation. Because pulse shape cannot be altered without changing the SAW device, multi modal functionality of the system is compromised.

More generalized and adaptable function is realized in the 'software embodied' Pulse Shaper device that is illustrated in the middle section of FIG. 4. Specific output pulse shapes can be realized using lookup tables and mixer functions. Aliased time domain signals can be effectively reduced using filters that are either digitally generated or implemented in real time. A hardware-implemented filter must be tunable and have sufficient RF and control bandwidth (pulse to pulse tunable time constant) to provide adequate blanking of the output RF pulse stream. This functional scheme allows waveform selectivity, multi-modal system performance, and calibration control, to be implemented within the same system architecture.

A more effective architecture implements the entire pulse shaping process in software. Pulse shape, mixing functions, alias filters can be individually controlled. This approach allows multifunction capability, multi-modal behavior, all on a pulse-to-pulse timing scheme. In this manner, adaptable system performance is achieved.

The hierarchical scheme may be realized in the design of a radar or sensor system by the following steps:
(1) identifying a global system organizational layer or level that comprises a structure that includes command, control, communication, and computational or processor elements,
(2) identifying at least one subordinate organizational layer or level that has analogous elements to the global system layer,
(3) defining and assigning C4I functional processes and configuration or performance characteristics for each level, and
(4) defining and specifying interface requirements between each neighboring level.

Figure 5:
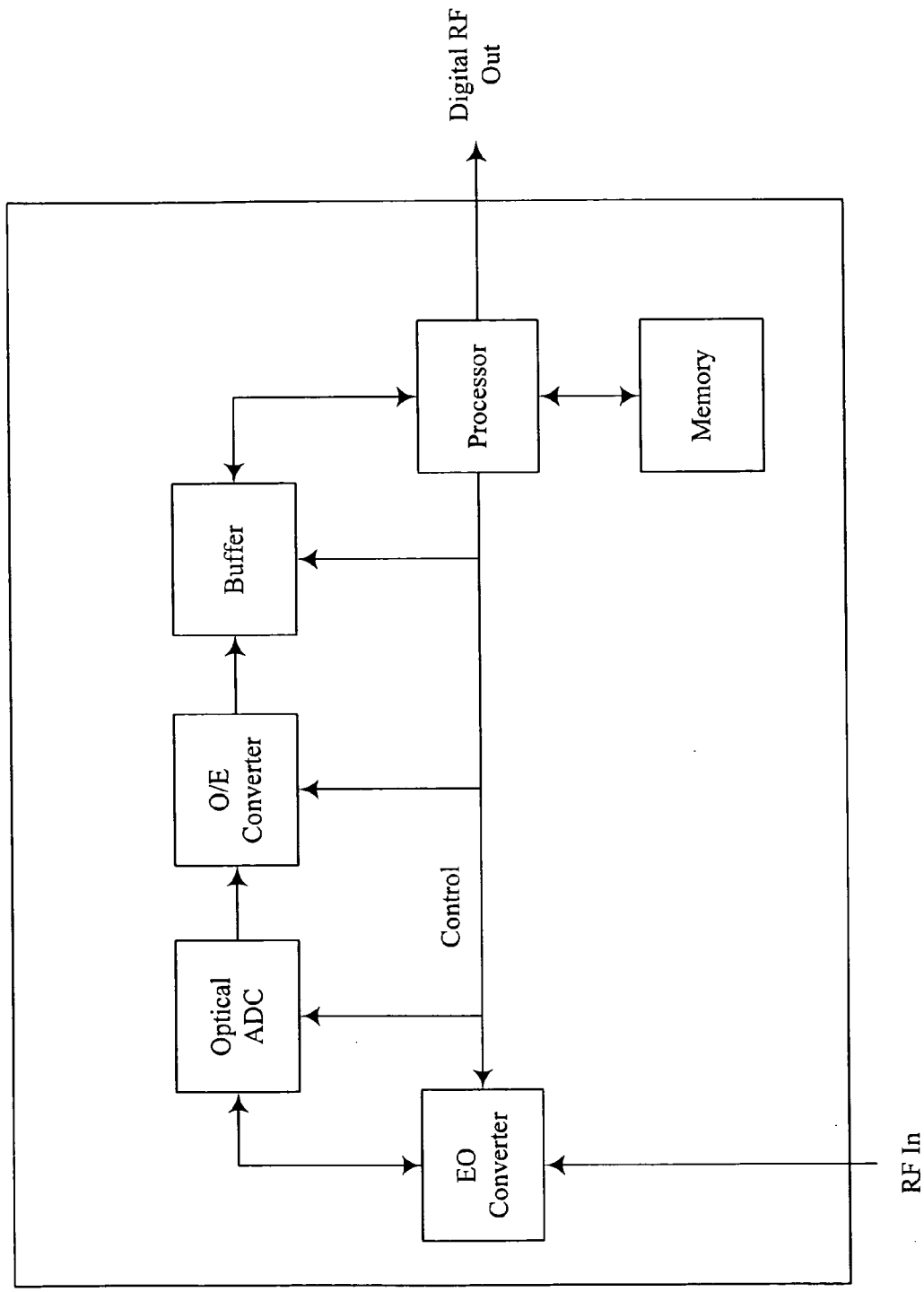
FIG. 5: This figure illustrates a high performance optical ADC.

The ADC modules are the most critical to defining overall digital system performance. System bandwidth, sample rate, resolution, and operational frequency all qualify the balance of the system implementation. The design illustrated in FIG. 5 is based on the high performance component of the future. With a 50 GHz potential sample rate this device could be used to sample base band frequencies up to 25 GHz. With the bandwidth of the RF signal approaching 100 to 250 MHz, this would provide a 10 to 25 times over-sampling potential. If available ADCs have less sampling capability, several alternatives will be used to move the digital conversion process as near to the RF front end as possible. Key to this implementation is the chosen architecture of the concept. Potential implementation strategies are illustrated in the next sections.

Figure 6:
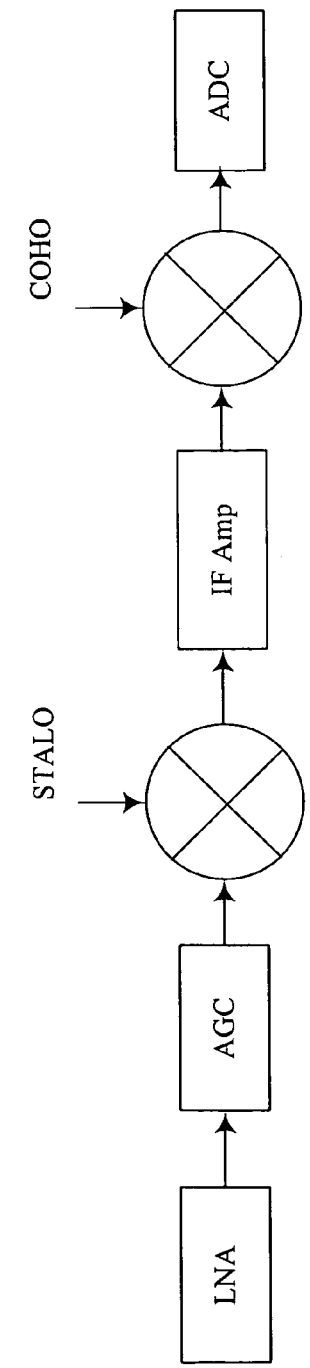
FIG. 6: This figure illustrates a front end of a generalized RF.
Figure 7:
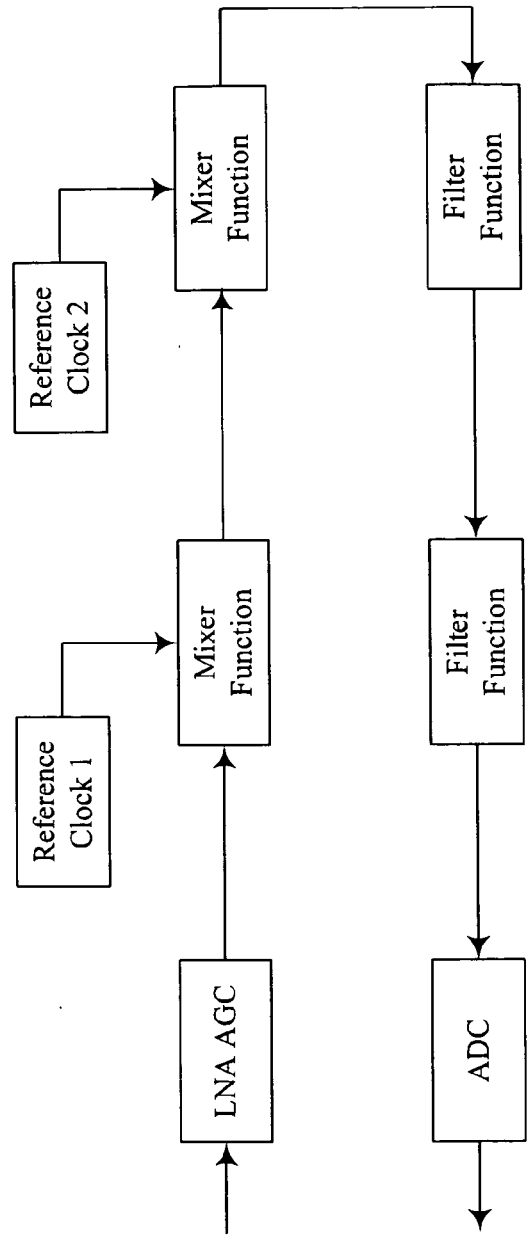
FIG. 7: This figure illustrates a functional block diagram.

A generalized RF frontend is illustrated in FIG. 6. THE STALO and COHO are included to provide down conversion to a frequency range where video processing can be implemented (both bandwidth and central frequency of the processor components). The functional behavior of this processing stream is illustrated in FIG. 7. If the ADCs used are incapable of sampling base-band frequencies, the reference clocks are chosen to allow frequencies within the performance specifications of the ADCs. This architecture will allow continuous system upgrade as ADC performance improves, without major system redesign.

Critical components of the system front end are the mixers and LNAs. The low noise amplifier sets the noise performance of the entire front end of the system. Any components such as filters or switches before the LNA will negatively impact the noise figure of the system if they exhibit loss or non linearity. HTS and cooled components can help to minimize this effect. Typical implementation approaches are illustrated in the next section.

Figure 8:
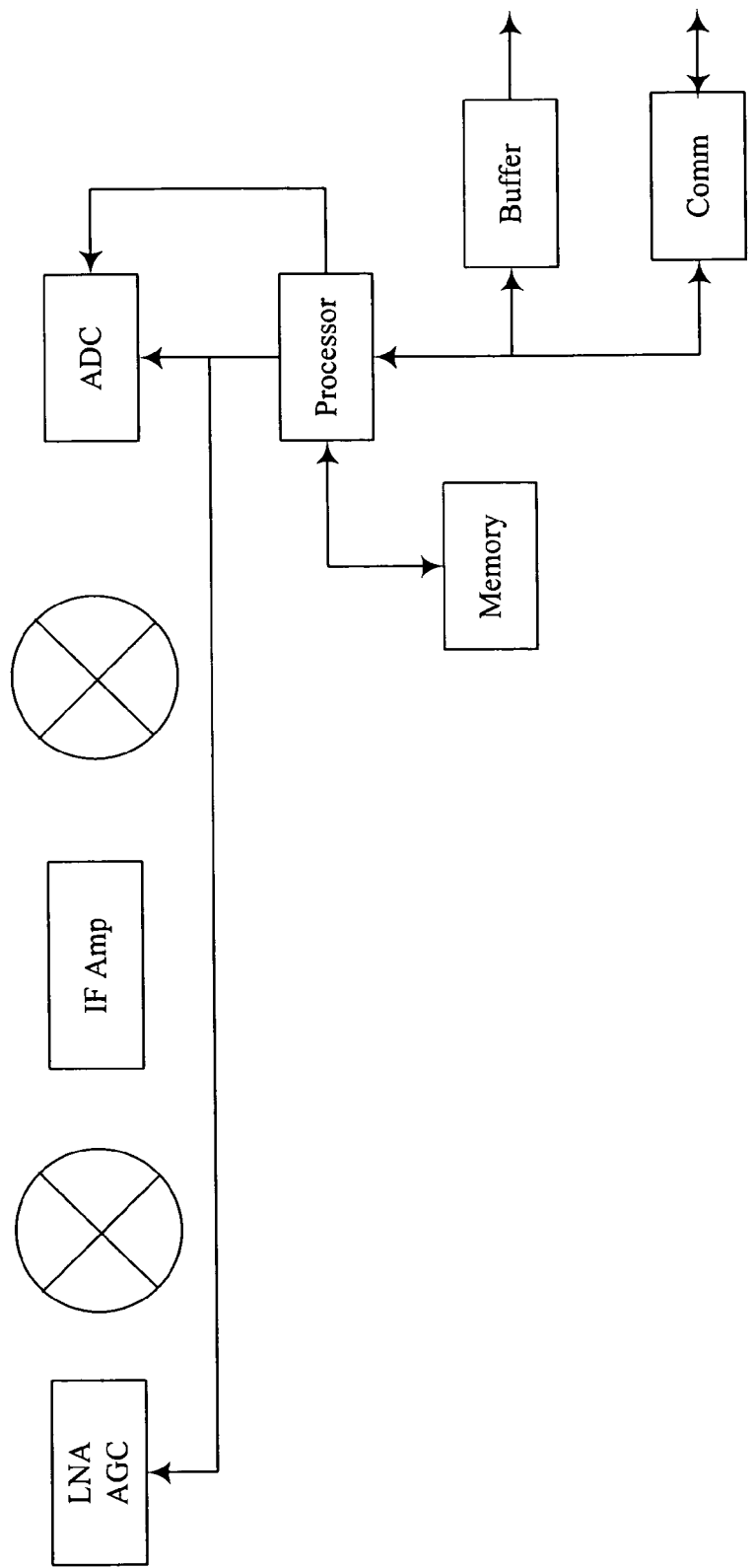
FIG. 8: This figure illustrates a network receiver front end version 1.
Figure 9:
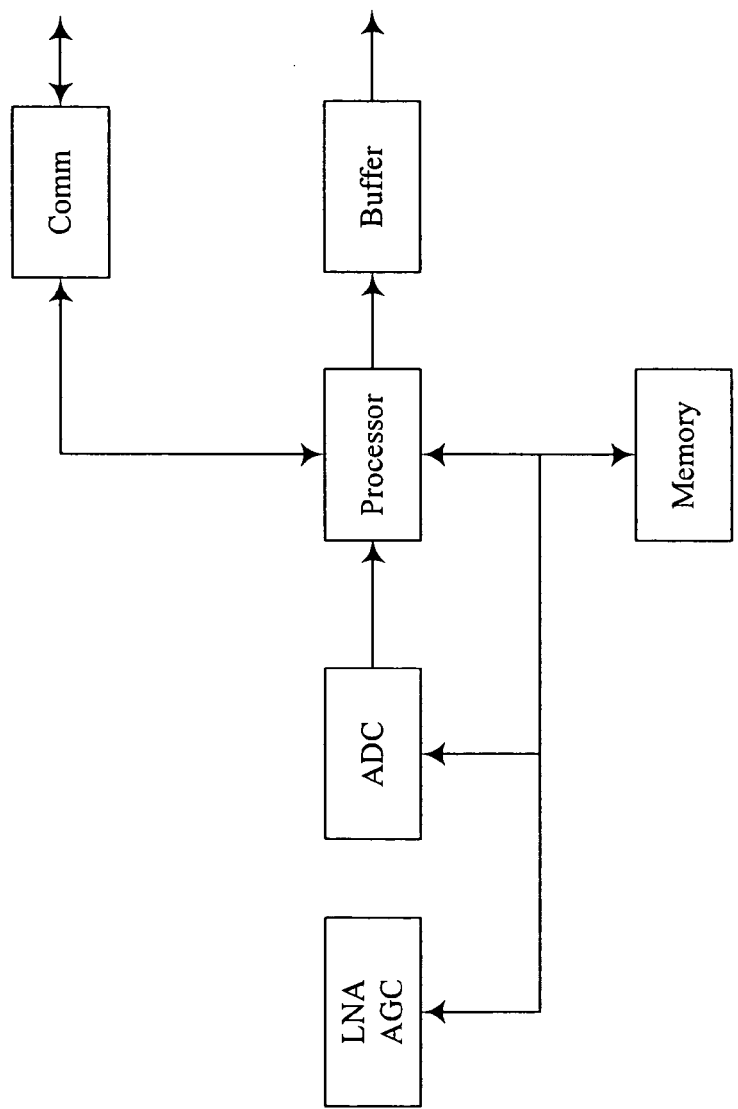
FIG. 9: This figure illustrates a network receiver front end version 2.

FIG. 8 illustrates a hybrid architecture that allows some down conversion capability at the system front end to match to the sampling characteristics of the ADC. The two frequencies can be coherently generated from a single master clock. This allows coherent timing of sample points, offsets, sample and hold functions, a fixed reference between I and Q channels and referenced inter-module sampling. As ADC performance improves all of these functional requirements continue to exist without redesign or modification. When ADC sampling rates allow base-band conversion the mixer functional can be eliminated from the system. This is illustrated in FIG. 9.

As soon as the signal reaches the ADC the balance of the signal paths consist of network interfaces. These are designated by the red component interfaces. The processor provides computational resources for signal conditioning, component control signals, I/O interfaces and communication interface to the balance of the system infrastructure. The network interface between the processor and the memory will likely be optimized to provide for transfer characteristics dictated by the processor. Other network physical layer and control layer protocols are more conventional in nature. Since the concept uses a hierarchical architecture, individual components typically associated with the receiver front end also have a network-based architecture. This is illustrated in the next section using the LNA/AGC component as a typical example.

Figure 10:
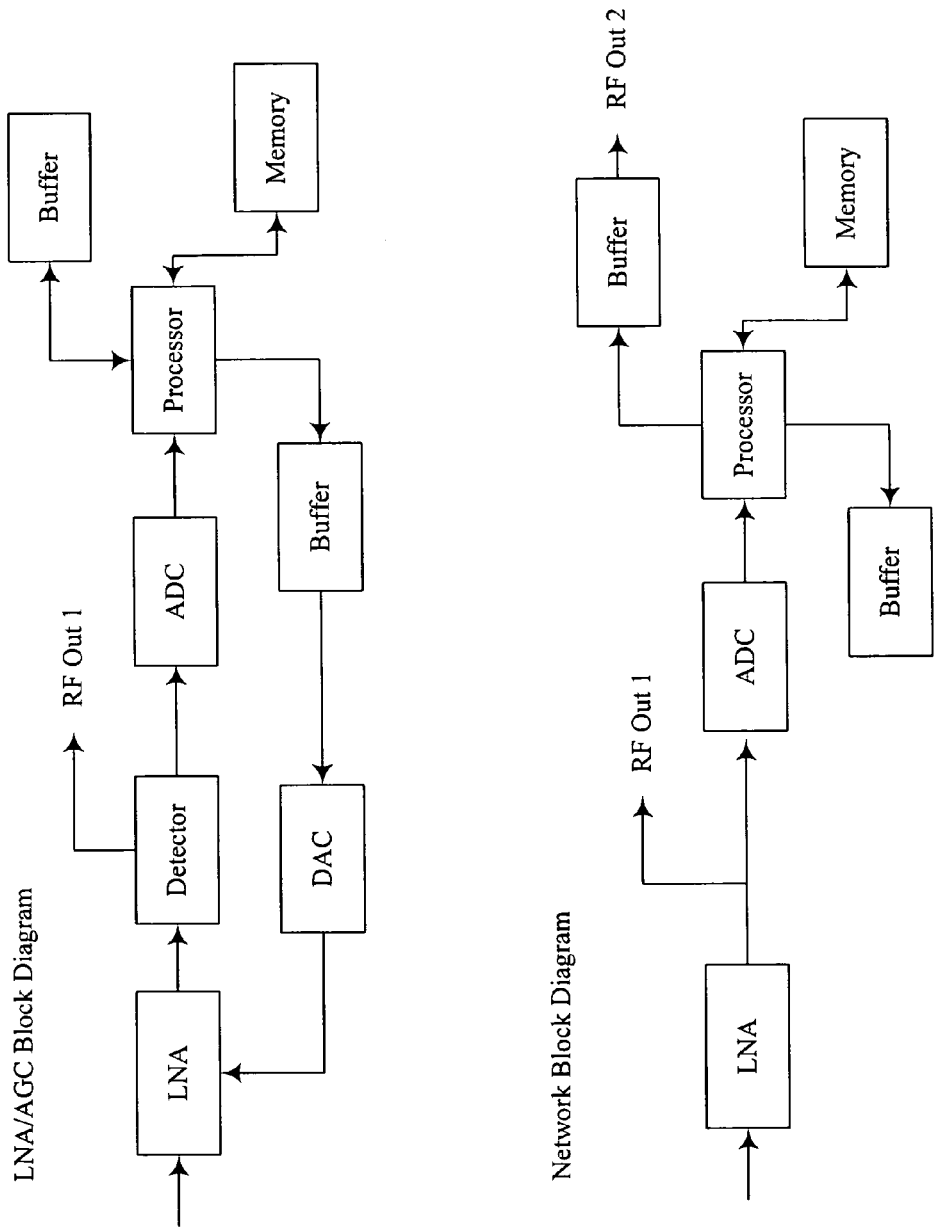
FIG. 10: This figure illustrates two versions of the AGC control implementation.

FIG. 10 illustrates two concepts of a typical AGC loop. The more traditional approach is described by the upper block diagram [19]. The RF signal is detected using a square law detector, sampled at low sample rate ADC analyzed by the processor and moved to a buffer. The output of the buffer is converted to analog and used to modify the gain of a voltage controlled LNA. The output RF out #1 is then used as the RF input to the balance of the RF front end. The lower block diagram in FIG. 10 illustrated a more advanced implementation where the sampling rate of the ADC is high enough to produce digital RF at out put 2. The AGC processing is performed on the high rate sampled signal using the processor to low pass filter and generate the AGC control signal to the LNA. Either version is allowable and can be scaled to incorporate improved performance devices.

Figure 11:
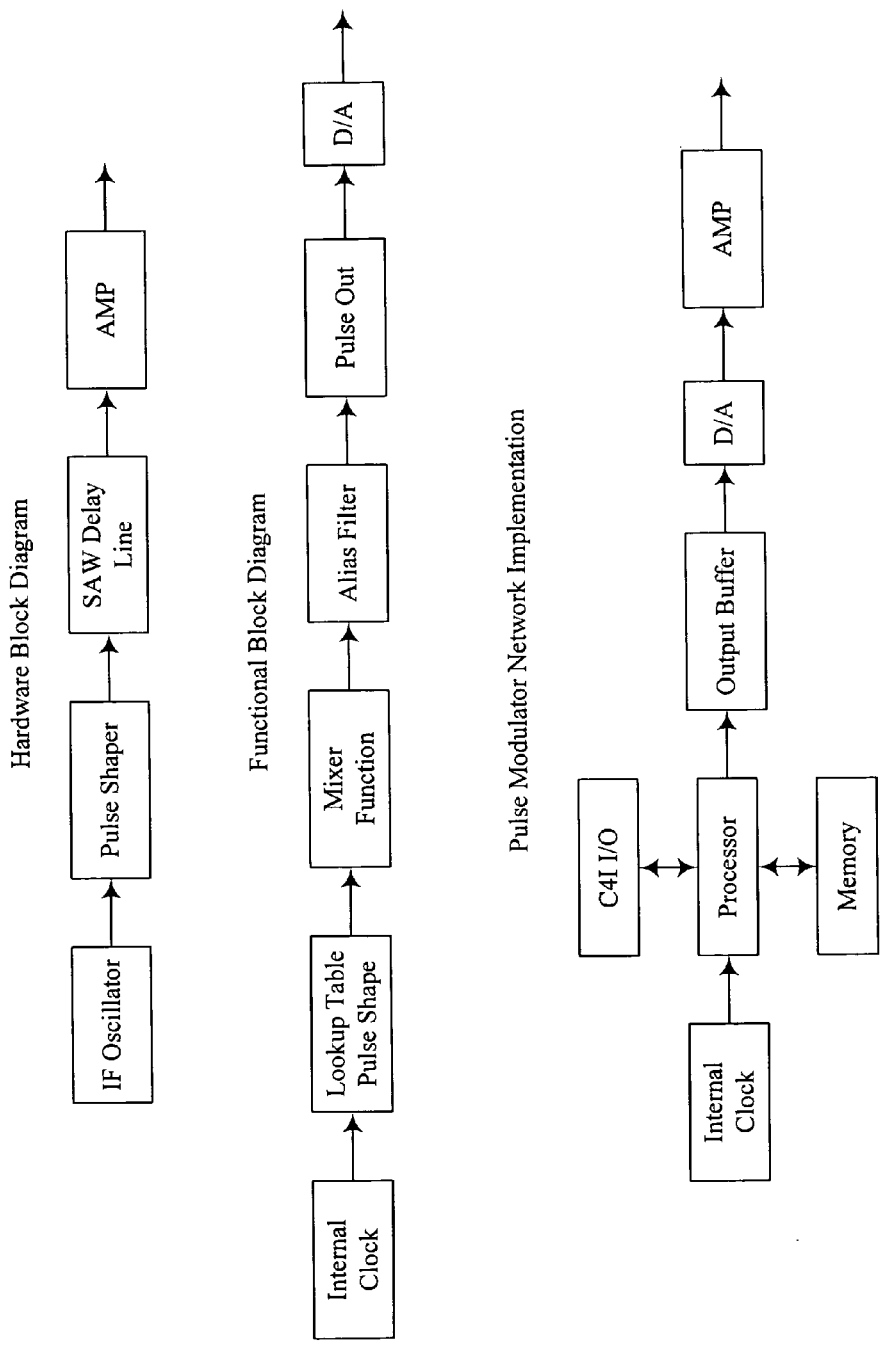
FIG. 11: This figure illustrates a pulse former module.

One of the most critical design components of the radar front end is the output pulse former. Specification of this subsystem impact SNR, clutter rejection, system gain, incorporated bandwidth, radiated power, and system response. Unfortunately, traditional systems commit the design to hardware implementation and eliminate signal shape selection and modulation/demodulation flexibility. This architecture strategy allows flexible shape selection, flexible demodulation/modulation scheme, and modality selection to be easily incorporated. The approach is illustrated in FIG. 11. This particular approach mimics the software and digital radio schemes currently used in commercial telecommunication infrastructure. Documented benefits include lower power requirements, improved SNR, higher quality signal structure, and increased allowable bandwidth. These technologies are directly transferable to radar and sensor architectures.

The conceptual design is described as a hierarchal description of four levels. The upper level is characterized by C4I descriptors integrated by wide area networking infrastructure. The midlevel descriptor is characterized by global system functionality integrated by more metro areas network computational interfaces. The lower level descriptor is characterized by subsystem physical connectivity integrated with local area network connectivity. The final layer (component layer) is characterized by descriptors of individual functional components supported by pico-network interfaces. This hierarchal structure is used to facilitate flexibility, upgrade without redesign, reconfigurability, multi-modal operation, resiliency, and redundancy. Each module can be described by a set of parameters with upper ands lower bounds. Once these have been identified, implementation schemes can be identified, and configuration down select initiated. The preliminary design process can then be started.

Figure 12:
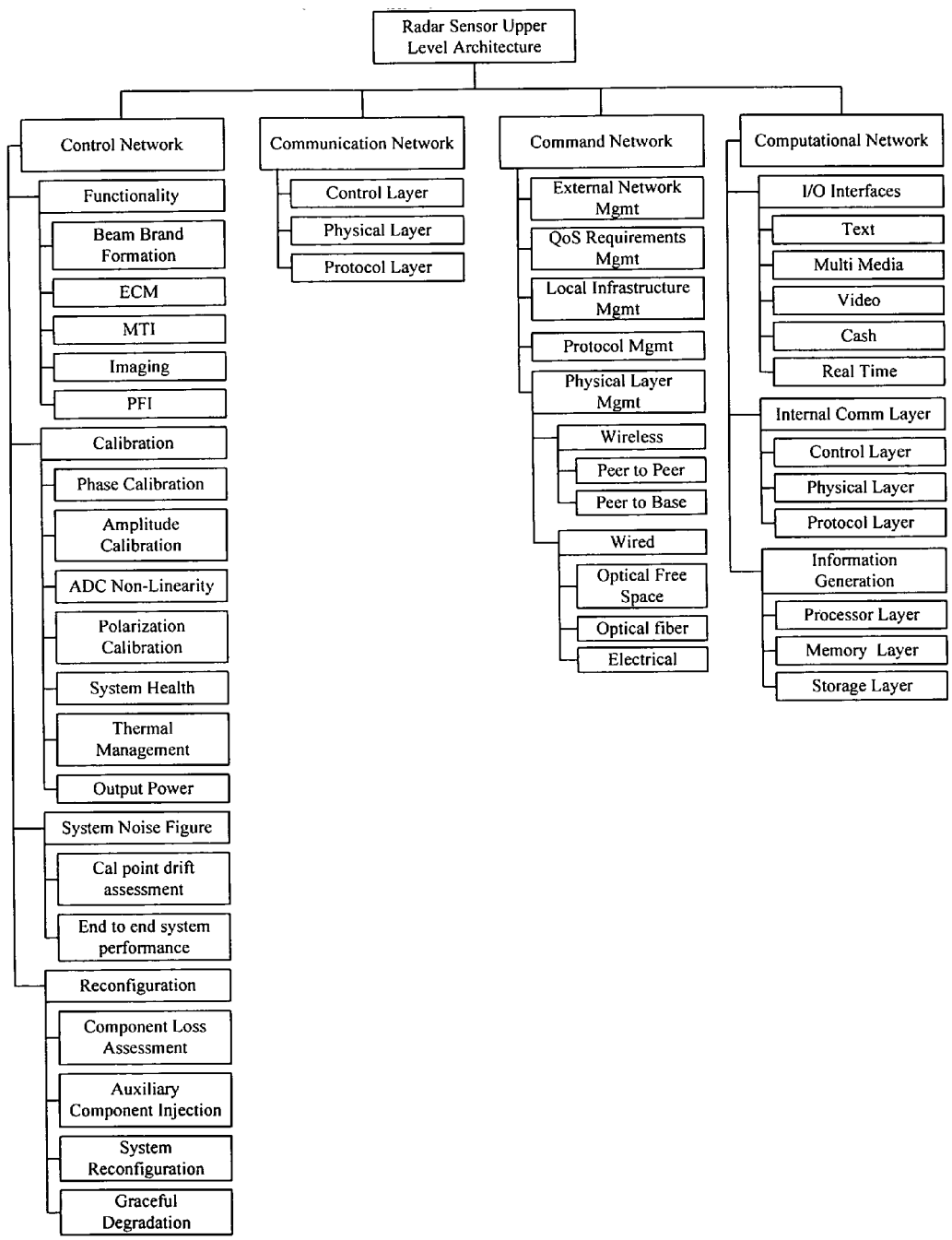
FIG. 12: This figure illustrates an upper level system architecture.

The upper level organizational diagram is illustrated in FIG. 12. The major interfaces of this organizational map include the traditional C4I interfaces. Battlefield management interfaces will be supported by traditional and advanced communications infrastructure. Within the sensor communication environment, sensor interfaces will include Control network interfaces, Communication network interfaces, Command network interfaces and Computational network interfaces. Control interfaces will accommodate system functional mode, system calibration, system health assessment, system reconfiguration, navigation interfaces, and system power management control. Communication interfaces will accommodate the physical, control and protocol layers associated with traditional communication links. This communication link is primarily concerned with data transfer.

The command interface supports internal data assimilation and analysis, battlefield management issues, and quality of service prioritization and implementation. Command access may be though any one of the four modules and direct interfaces can exist between each of the modules accessible though command GUIs or any of the modules individually or collectively. Finally, the computational interfaces support, both internal and external data analysis, information generation, product generation, and computational requirements associated with battlefield management decision making. The conceptual design requirements of each of the upper level system modules will be describe in the following sections.

Figure 13:
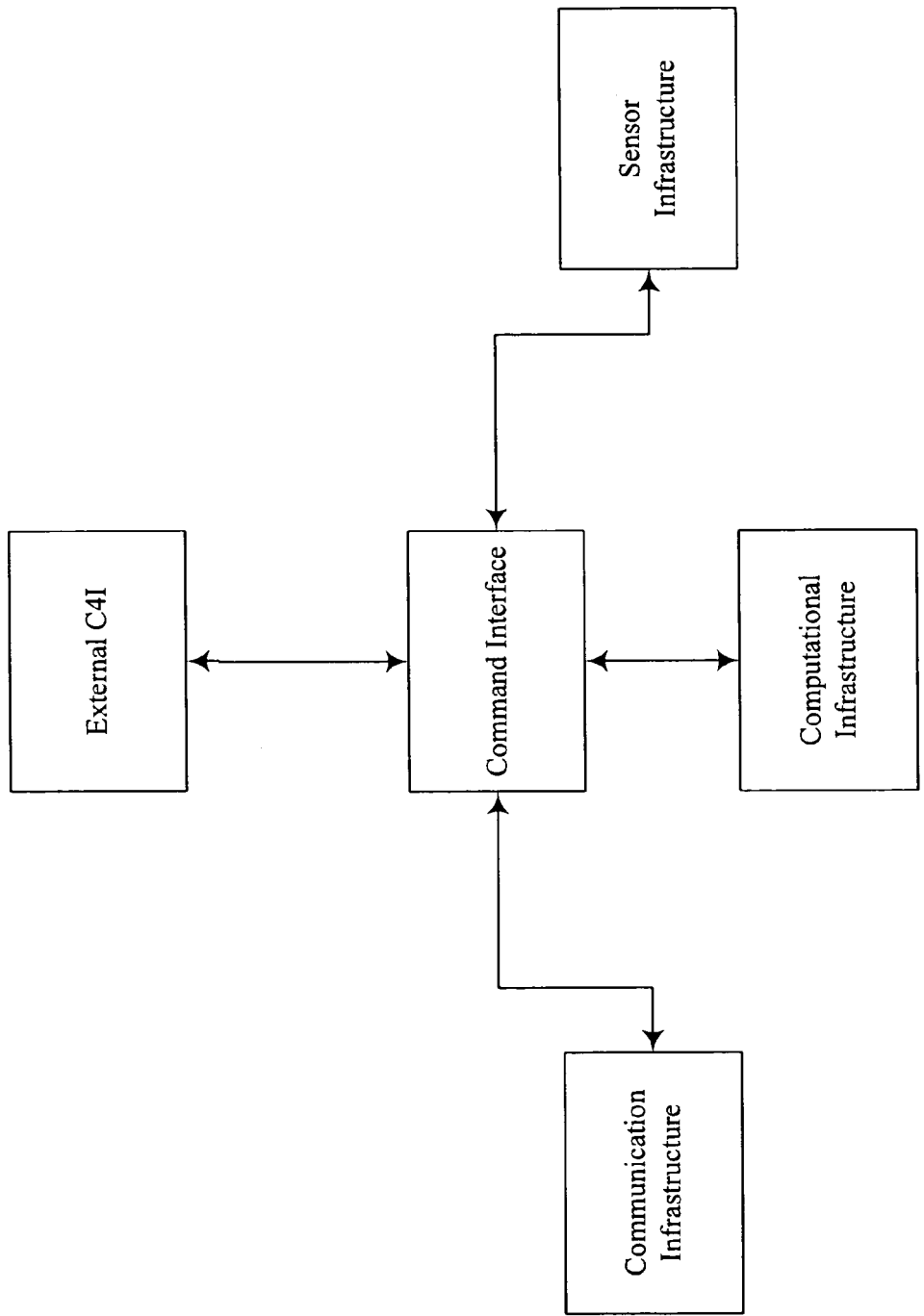
FIG. 13: This figure illustrates the system command interfaces.

The functional interfaces of the Command Architecture are illustrated in FIG. 13. Critical issues include the requirement to task sensor performance and modality, monitor external C4I interfaces, and task communication and computational resources.

The Command Architecture will have the following functional support infrastructure:

Local Infrastructure network management

QoS requirements management

Protocol infrastructure management

External network interface management

Physical layer management (including wireless and wired interfaces)

Control layer management

Interface to local and global Communications, Control and Computational support infrastructure Performance requirements of the Command Architecture will be specific to the operation of the sensors and their interface to command infrastructure.

Local Infrastructure network management

Support bandwidth sufficient to task sensors (low data rate sensor control commands 10's of Kbps, high data rate calibration parameters, targeting data, etc. >10 Gbps)
Low latency (less that 1 second)
Reconfigurable within 1 second
QoS command interfaces (C4I local and global connectivity, redundancy, reconfigurability, low to high data rates, kbps to gbps capable)
QoS requirements management
Architecture has organization control of QoS protocol selection and implementation.
Override control of Asset functionality, operation configuration and pointing
Low bandwidth (~kbps) communication interfaces enabled by point and click functionality.
Protocol infrastructure management
Pre-determined protocol selection stack
Provision for online modification of protocol stack as situations permit
Embedded priority selection
Selectable variable communication and control architecture
External network interface management
Management of external communication interfaces
Selection of data formats (automated)
Selection of encryption algorithms (automated)
Selection of the communication physical layer (manual <1 sec, automated <100 ms)
Generation of interface protocols (automatic)
Command of system override functionality (<1 sec)
Physical layer management (including wireless and wired interfaces)
Automated physical interconnect selection (switchover <1 sec)
Redundancy and reconfigurability management (automated, switch latency <100 ms)
Traffic provisioning
Interface to local and global Communications, Control and Computational support infrastructure
GUI interface
Seamless interconnect to communications, control and computational networks
GUI bandwidth required to support display, control, and command functions (e.g. image refresh ~XVGA at 30 fps)

Figure 14:
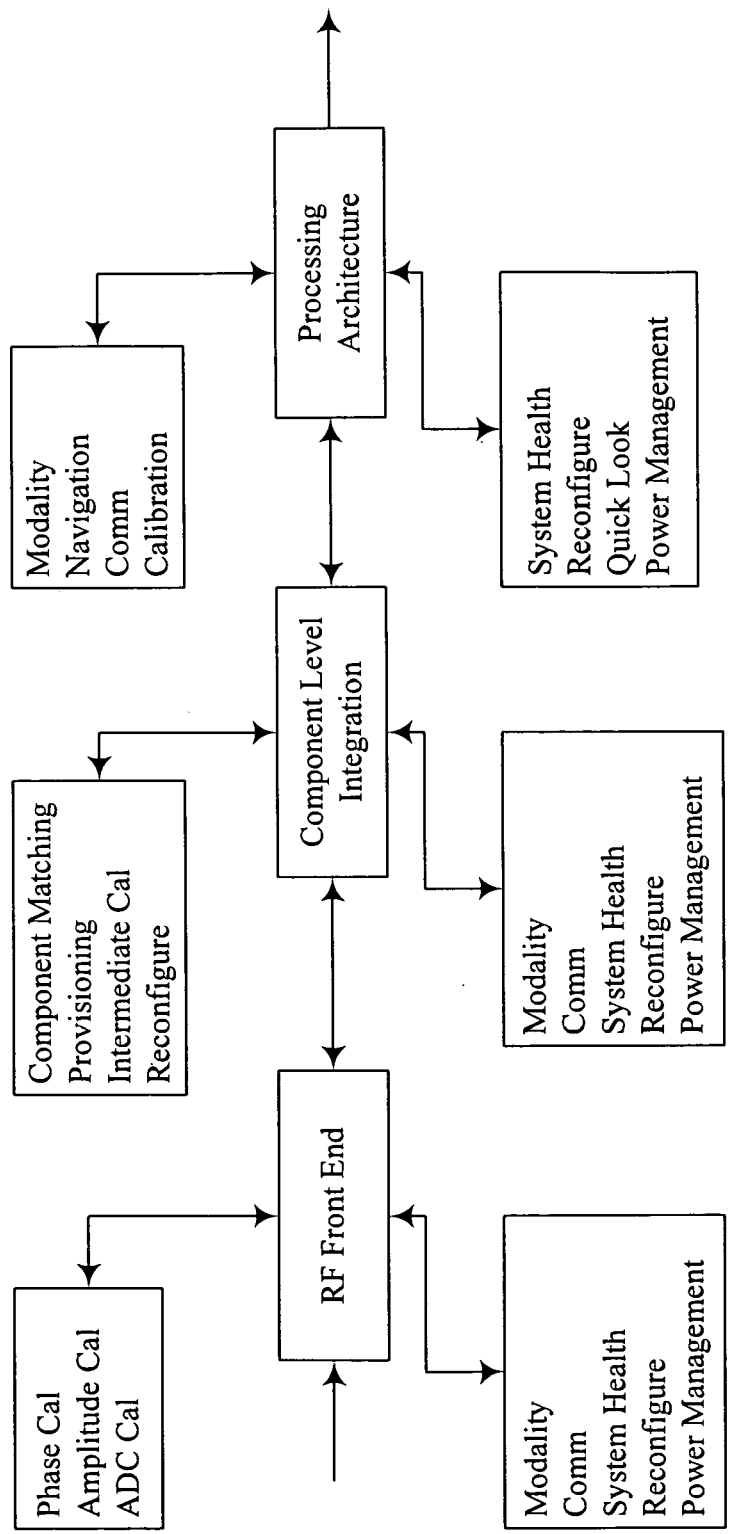
FIG. 14: This figure illustrates the system control interfaces.

The design constrains focus on the ability to improve system performance, allow performance upgrades and incorporate revolutionary system design implementations. The main elements are listed below:

Minimize power consumption
Open architecture
Upgrade potential for the future
Short term dem-val capability
Long term integration and procurement
Reduced concept to deployment timeline
TULIP conforming protocol
Direct interface to DoD—Tactical Common Data Link The major interfaces of the sensor control architecture are illustrated in FIG. 14. Functional interfaces will vary from level to level as appropriate.

The major functional requirements of the control architecture are listed as follows:
Command system functionality (including Beam Scan/formation, ECM, MTI, Imaging, PPI, etc.)
Command system calibration (including phase, amplitude, system nonlinearity, polarization, etc.)
Monitor and control system health (including, thermal management, output power, system noise figure, cal point drift, end to end system performance, etc.)
Control system reconfiguration (including, component loss assessment, auxiliary component injection, system reconfiguration, graceful degradation, etc.)

Performance requirements of the Control Architecture will be specific to the operation of the sensors and their interface to command infrastructure.

Monitor and control system functionality
Support bandwidth sufficient to task sensors (low data rate sensor control commands 10's of Kbps, high data rate calibration parameters, targeting data, etc. >10 Gbps)
Low latency (less that 1 second)
Reconfigurable within 1 second
Download specialty performance characteristics e.g. new wave forms, processing parameters, etc. (C4I local and global connectivity, redundancy, low to high data rates, Kbps to Gbps capable)
Integrate navigation (INS and GPS) inputs to system control requirements (support communication bandwidth necessary for system functionality, requirements dictated by the implemented navigation architecture). For example a closely coupled INS/GPS requires short interval updates from GPS (higher bandwidth requirements). Loosely coupled systems can rely on the INS to provide short interval navigation information with longer interval correction from GPS downloads (lower bandwidth requirements).
Monitor and control system calibration
Architecture has organization control of calibration at the component, low and mid level system architecture points
Override control of Asset functionality, operation configuration and pointing
Low bandwidth (~kbps) communication interfaces support by high band with communication ports when required.
Monitor and control system health
Collect sensor measurement data assess conditions (~Kbps comm. interfaces)
Provision for online system heal assessment and performance
Embedded redundancy selection
Selectable variable communication and control architecture interfaces
Monitor and control system reconfiguration
Management of external system assessment interfaces
Selection of system reconfiguration (automated)
Selection of performance modes (manual)
Generation of graceful degradation protocols (automatic)
Command of system override functionality (<1 sec)

Figure 15:
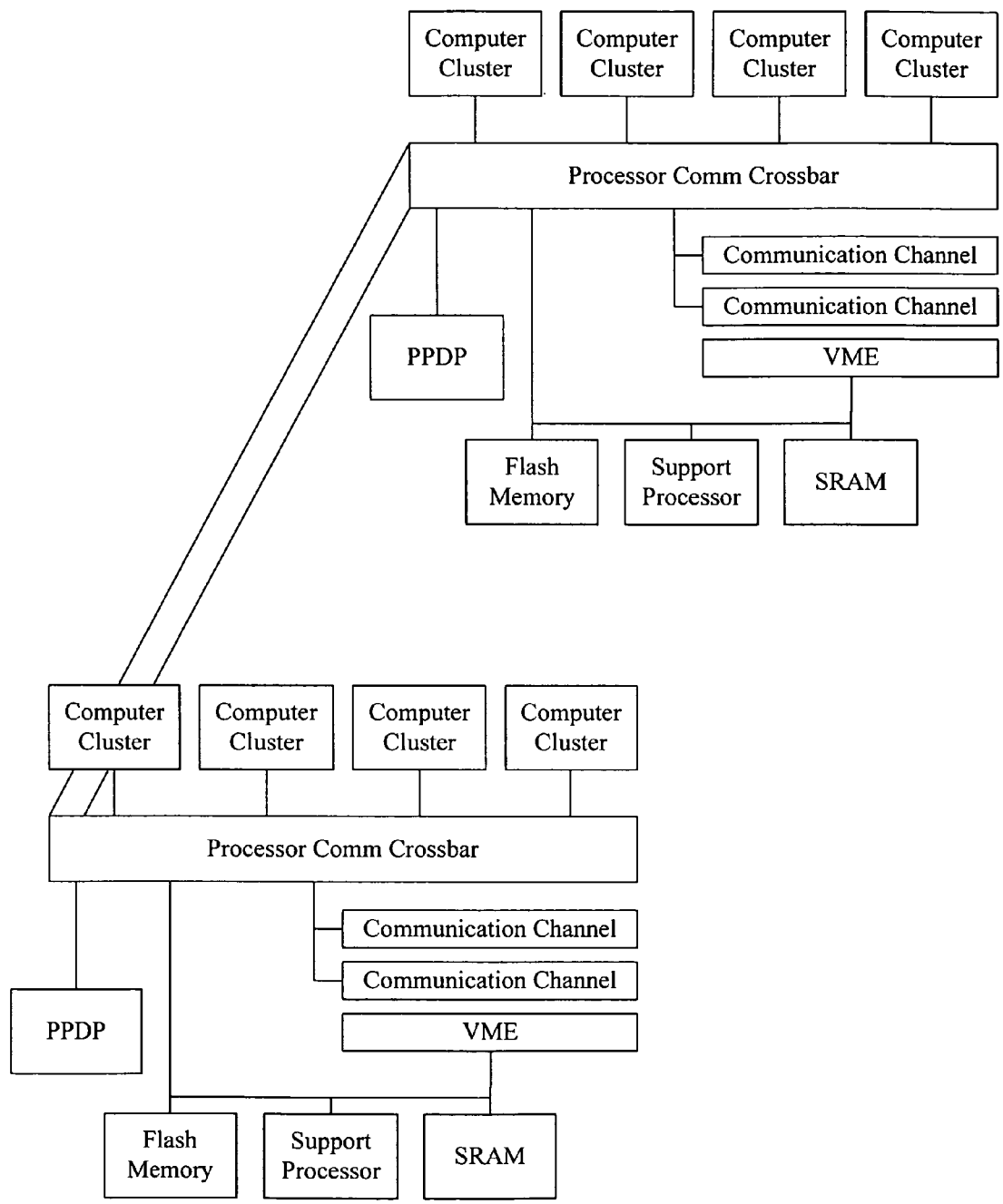
FIG. 15: This figure illustrates the computational architecture of the upper level architecture.

The design constrains focus on the ability to improve system performance, allow performance upgrades and incorporate revolutionary system design implementations. The main elements are listed below:

Minimize power consumption
Open architecture
Upgrade potential for the future
Short term dem-val capability
Long term integration and procurement
Reduced concept to deployment timeline
TULIP conforming protocol
Direct interface to DoD—Tactical Common Data Link
Selection of minimum performance specifications The computational architecture of the upper level architecture is illustrated in FIG. 15. One of the most critical functional requirements is scalable performance capability. The particular architecture presumes a parallel computational interface. Most computational functions in the upper level architecture are inherently parallel. This approach will allow scalable processing power upgrades will little system redesign. The design approach allow all types of compute clusters as well, including microprocessors, Field Programmable Gate Arrays (FPGAs), DSPs, ASICs, and any other current or yet to be developed technologies.

The major functional requirements of the computational architecture are listed as follows:

Support the I/O interface in the C4I infrastructure including text, multi-media, video, real time product generation, etc.

Support internal communication protocols (between processors and within the LAN and WAN of the C4I infrastructure.

Support information generation from multiple sensor, data base and communication inputs.

Support automated information analysis

Support the GUI to the C4I infrastructure.

Performance requirements of the Computational Architecture will be specific to the operation of the sensors and their interface to command infrastructure.

Support the I/O interface in the C4I infrastructure including text, multi-media, video, real time product generation, etc.
  computational speed will vary from 10 s of GFLOPs per seconds for a single computational processor, to greater than a TFLOPs per second for multi processor functionality
  Low latency (less that 1 second)
  Reconfigurable within 1 second
  Hot swappable hardware Support internal communication protocols (between processors and within the LAN and WAN of the C4I infrastructure.
  (Inter-device communication and data transfer bandwidths will approach 350 to 500 MBps.
  LAN and WAN bandwidths will require 10 to 40 Gbps for adequate data and information transfer).

Support information generation from multiple sensor, data base and communication inputs.
  computational speed will vary from 10 s of GFLOPs per seconds for a single computational processor, to greater than a TFLOPs per second for multi processor functionality
  Memory requirements vary from one giga-byte per individual processor to greater than a terabyte for the aggregate computational system
  Memory speeds support processor requirements
  Memory buss structure specific to processor architecture
  Storage requirements structure on a enterprise oriented, fiber interfaced Storage Area Network (SAN) (total storage capacity on the order of 100 s of terra-bytes)

Support automated information analysis
  Meet the needs of the C4I infrastructure (real time, latency, quality, etc.)

Figure 16:
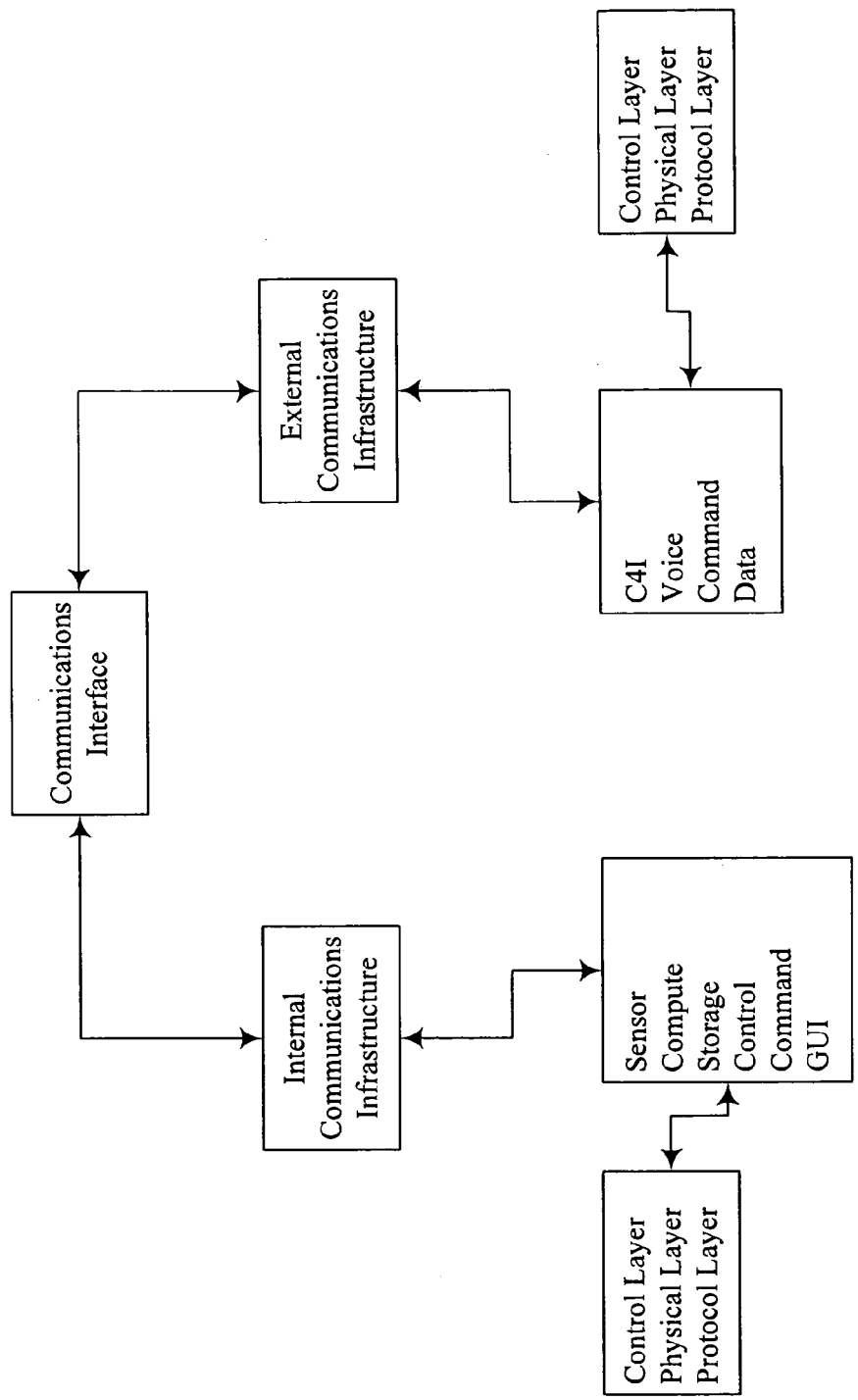
FIG. 16: This figure illustrates the system communications interface.

Support the GUI to the C4I infrastructure.
  Meet the needs of the C4I command infrastructure The design constraints focus on the ability to improve system performance, allow performance upgrades and incorporate revolutionary system design implementations. The main elements are listed below:
  Minimize power consumption
  Open architecture
  Upgrade potential for the future
  Short term dem-val capability
  Long term integration and procurement
  Reduced concept to deployment timeline
  TULIP conforming protocol
  Direct interface to DoD—Tactical Common Data Link
  Scalable architecture The communication architecture of the upper level architecture is illustrated in FIG. 16. One of the most critical functional requirements is scalable and interoperable infrastructure.

The major functional requirements of the computational architecture are listed as follows:

Support the communications I/O interface in the C4I infrastructure including text, multi-media, video, real time product generation, etc.

Support internal communication protocols (between processors and within the LAN and WAN of the C4I infrastructure.

Support information transfer from multiple sensor, data base and C4I inputs.

Support automated information analysis

Support the communications requirements to the GUI and the C4I infrastructure.

Support the Control, physical and protocol layers of the communications infrastructure Performance Requirements Performance requirements of the Computational Architecture will be specific to the operation of the sensors and their interface to command infrastructure.

Support the communications I/O interface in the C4I infrastructure including text, multi-media, video, real time product generation, etc.

Support internal communication protocols (between processors and within the LAN and WAN of the C4I infrastructure.
  Support QoS protocols
  Support physical and control communication infrastructure (typically kbps, to fractional gbps interfaces)

Figure 17:
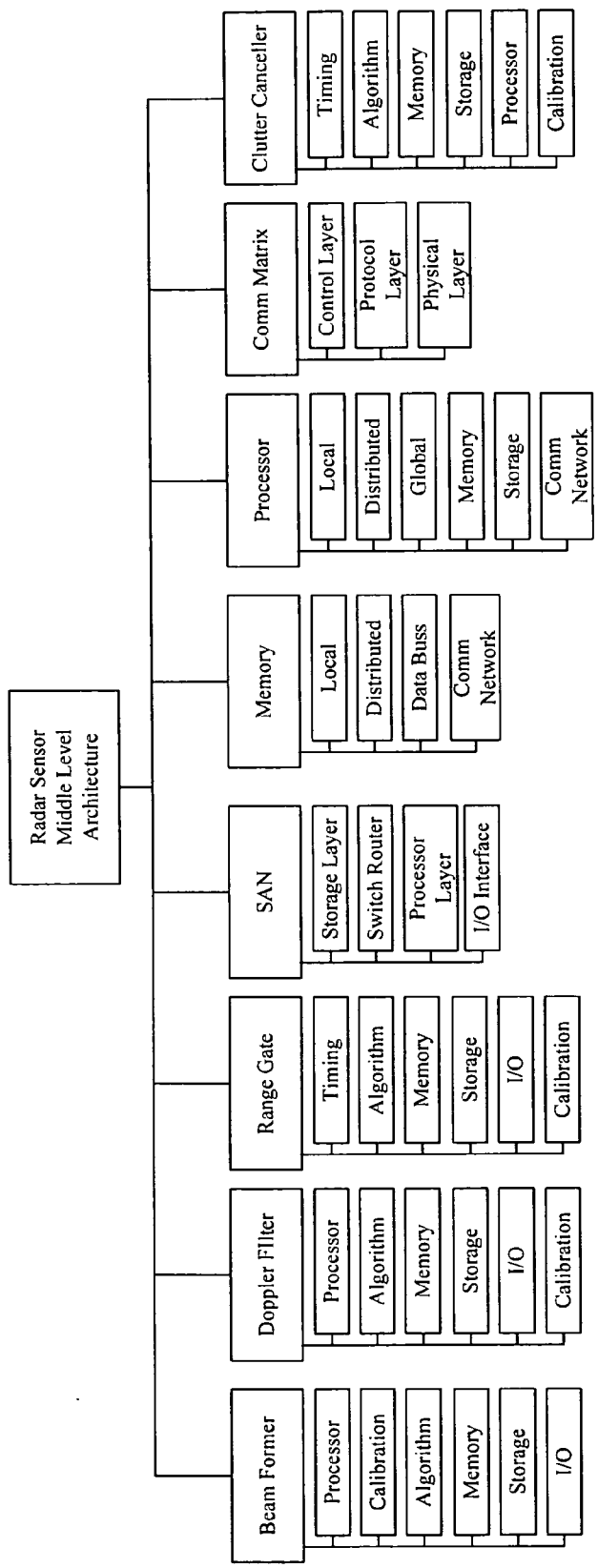
FIG. 17: This figure illustrates the mid level system architecture.
Figure 18:
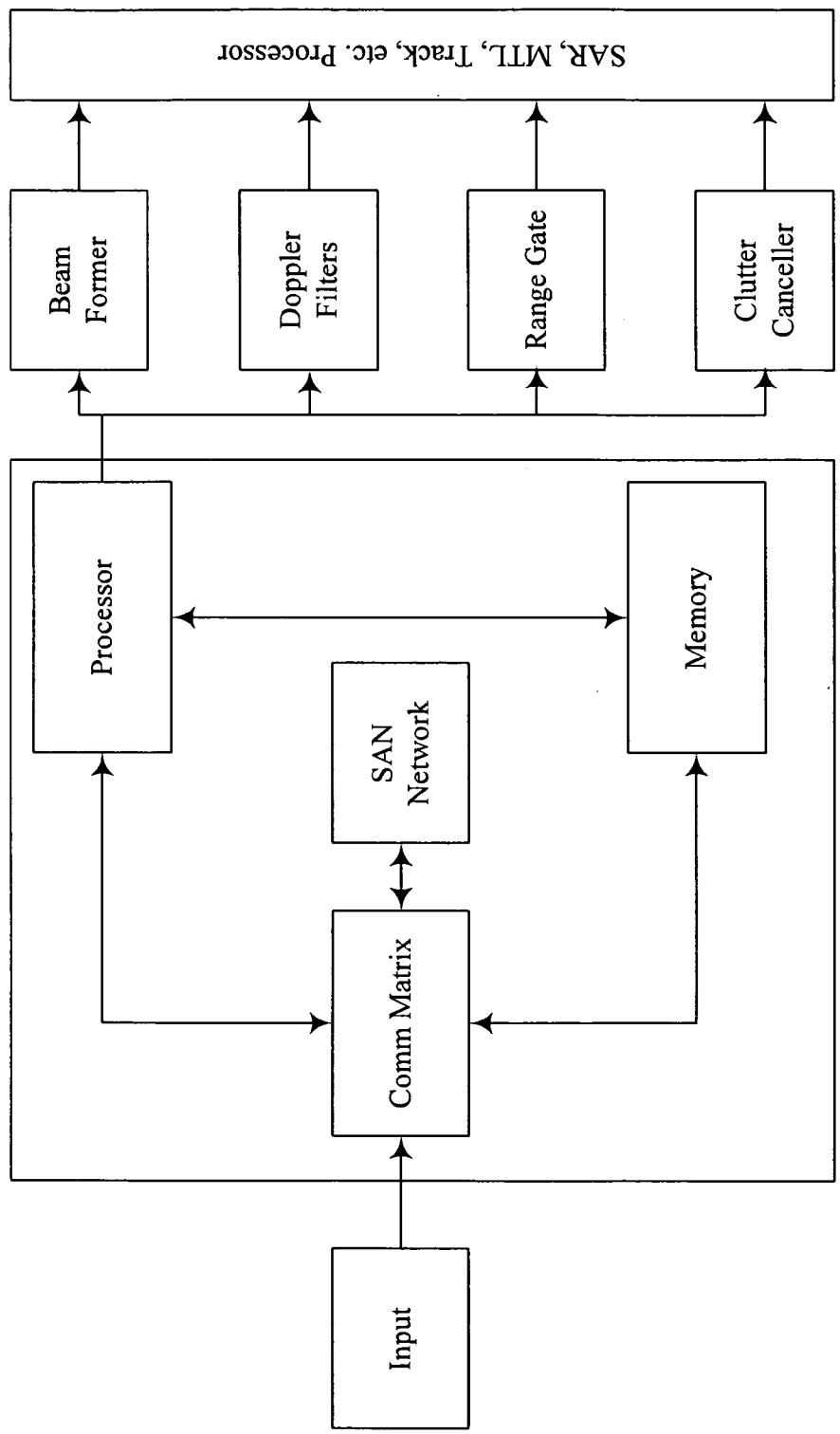
FIG. 18: This figure illustrates a mid level functional block diagram.

Support information transfer from multiple sensor, data base and C4I inputs.
  Support kbps to gbps interfaces Support the communications requirements to the GUI and the C4I infrastructure.
  Support mbps to gbps bandwidths Support the control, physical and protocol layers of the communications infrastructure
  Support gbps bandwidths, interoperability, multiple physical layers and multiple protocols The design constrains focus on the ability to improve system performance, allow performance upgrades and incorporate revolutionary system design implementations. The main elements are listed below:
  Minimize power consumption
  Open architecture
  Upgrade potential for the future
  Short term dem-val capability
  Long term integration and procurement
  Reduced concept to deployment timeline
  TULIP conforming protocol
  Direct interface to DoD—Tactical Common Data Link
  Scalable architecture The objective of the midlevel architecture is to support the computational functionality of the sensor system. This component of the systems architecture is where both hardware and software interfaces are constructed and managed. The mid level architecture modules are illustrated in FIG. 17. The software implement models include the beam former, clutter canceller, Doppler filters, and range gate filters. The hardware implementation infrastructure comprises the SAN, Memory, Processors, and communication infrastructure. Functionally this architectural level provides the sensor with modality selection under software control and interface to the upper level architecture. Block diagram functionality is illustrated in FIG. 18.

Figure 19:
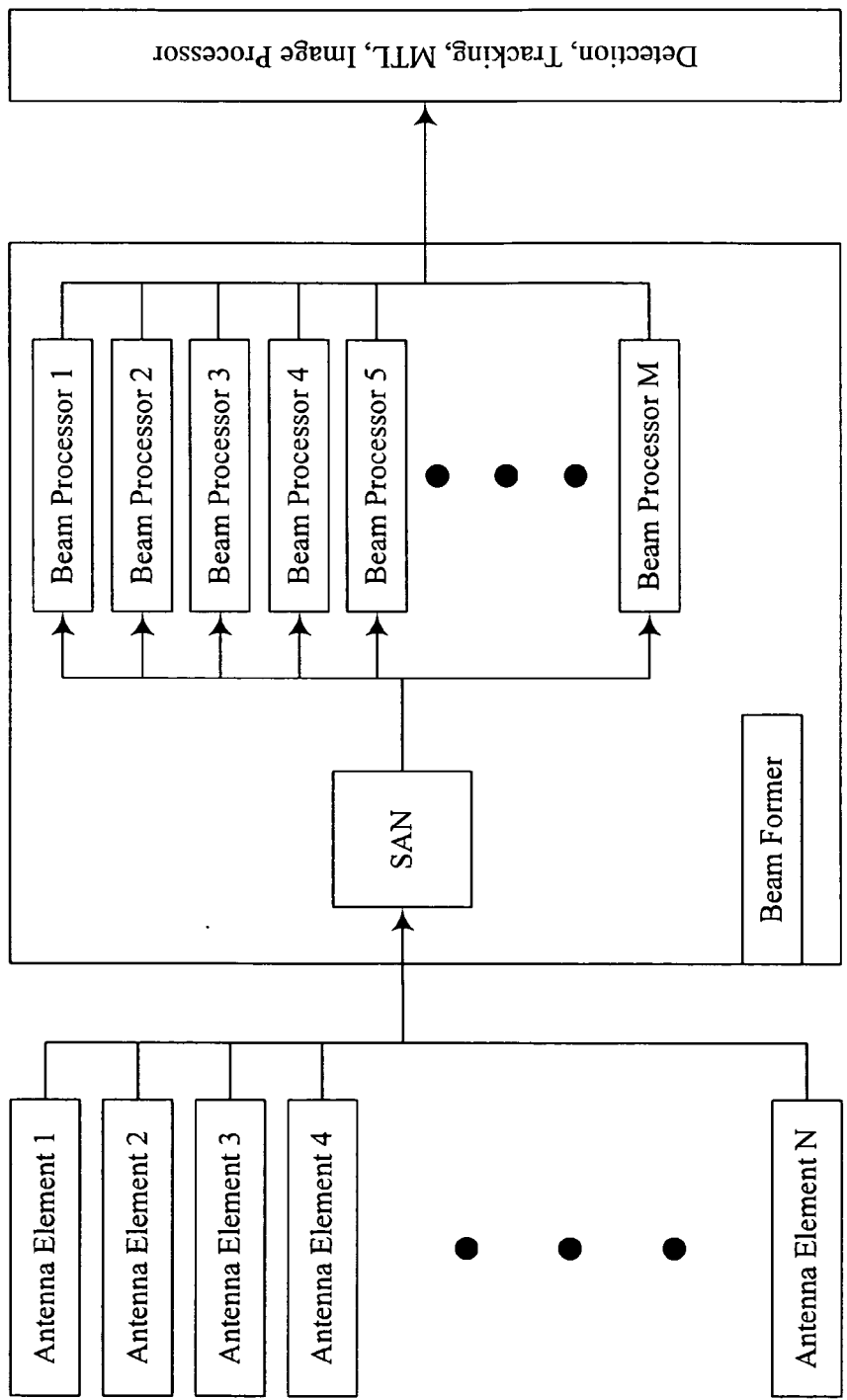
FIG. 19: This figure illustrates the beam former architecture.

The major components of the mid level architecture include the following:

Beam Former:
Processor
Calibration Loop
Implementation algorithm
Memory
Storage
I/O interfaces
Doppler filters
Processor
Calibration Loop
Implementation algorithm
Memory
Storage
I/O interfaces
Range Gate filters
Processor
Calibration Loop
Implementation algorithm
Memory
Storage
I/O interfaces
Clutter canceller
Processor
Calibration Loop
Implementation algorithm
Memory
Storage
I/O interfaces
SAN
Storage layer
Switch/router layer
Processor layer
I/O interface
Memory
Memory
Local
Distributed
Data Buss
Communications interface
Processors
Local
Distributed
Global
Memory
Storage
Communications interface
Communications Infrastructure
Physical Layer
Protocol Layer
Control Layer The beam former implementation scheme is illustrated in FIG. 19.

The major data structures for this mid level architecture include the following:

Input data structure from the lower level architecture modules (Quadrature digital data from the output of the antenna elements (12 to 16 bit ADC output, 64 bit floating point, time stamp, format compatible with the optical input of the SAN))

Output data from the SAN to the processors (format compatible with the output of the SAN, input of the processor, Memory interface specific to the buss structure of the processor, processor output format compatible with the specified network protocol (variable)) Processor interface structure is illustrated in FIG. 14).

Communication data structures compatible with network physical layer, control layer, and protocol layer requirements.

Navigation Data structure from GPS/INS, compatible with output of both devices

The major external interfaces to the beam former module include:

Data interface to sensor front end
Data interface to sensor modality processors
Data interface to the C4I infrastructure
Data interface to Navigation system The major internal interfaces of the beam former module include the following:

Memory
Storage
Multiprocessor
Control
Communication
Network

Critical to future scalability issues is the incorporation of a networked infrastructure in all module components. The SAN, Processor, memory and C4I interfaces require multi module architectures to be expandable. Although a single module SAN could be incorporated in a design, it is understood that this would be implemented with multiple SAN's on the same network with access to several processor module functions. The inherent assumption of networked architectures for ADC, memory, storage, network and processor components enable future upgrade and scalable performance improvements without system redesign. Design architectures that inherently rely on a single device to implement functionality have restricted upgrade capability. Functionality is limited by device specification and performance, upgraded performance requires devices with improved capability generally requiring redesigned architectures. The suggested architecture assumes networked interfaces that accommodate multiple devices, each sharing performance requirements. When improved functionality is required, additional devices can be added to the network architecture without the need for redesign. The architecture accommodates improved functionality, and transition from analog to digital (and vice versa) within its original structure.

Very few technical risks exist with this architecture design. Limited performance item need only be placed in parallel to achieve performance gains. Tradeoff with footprint, power consumption, etc. will force transition solutions to be implemented. Within the foreseeable future, technical performance will not be limited by device governing laws.

Figure 20:
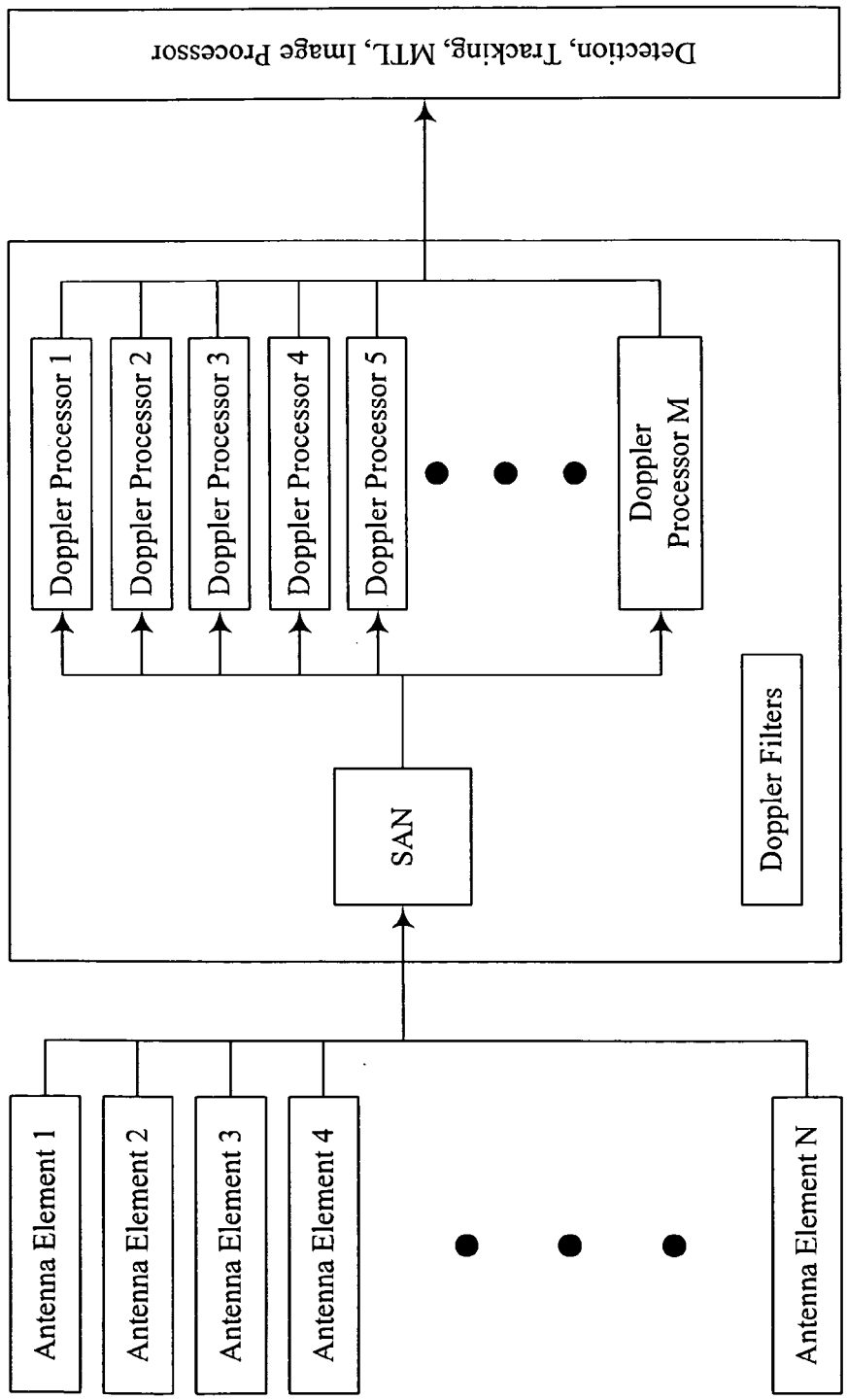
FIG. 20: This figure illustrates the Doppler processor architecture.

The beam former implementation scheme is illustrated in FIG. 20.

The major data structures for this mid level architecture are similar to the beam former and include the following:

Input data structure from the lower level architecture modules (Quadrature digital data from the output of the antenna elements (12 to 16 bit ADC out put, 64 bit floating point, time stamp, format compatible with the optical input of the SAN))

Output data from the SAN to the processors (format compatible with the output of the SAN, input of the processor, Memory interface specific to the buss structure of the processor, processor output format compatible with the specified network protocol (variable)) Processor interface structure is illustrated in FIG. 14)

Communication data structures compatible with network physical layer, control layer, and protocol layer requirements.

Navigation Data structure from GPS/INS, compatible with output of both devices

The major external interfaces to the beam former module include:
  Data interface to sensor front end
  Data interface to sensor modality processors
  Data interface to the C4I infrastructure
  Data interface to Navigation system The major internal interfaces of the beam former module include the following:
  Memory
  Storage
  Multiprocessor
  Control
  Communication
  Network Critical to future scalability issues is the incorporation of parallel infrastructure in all module components. The SAN, Processor, memory and C4I interfaces require multi module architectures to be expandable. Although a single module SAN can be used, it is understood that this would be implemented with multiple SAN's on the same network with access to several processor module functions. The inherent assumption of parallel architectures for ADC, memory, storage, network and processor components enables future upgrade and scalable performance improvements without system redesign.

Very few technical risks exist with this architecture design. Limited performance item need only be placed in parallel to achieve performance gains. Tradeoff with footprint, power consumption, etc. will force transition solutions to be implemented. Within the foreseeable future technical performance will not be limited by device governing laws.

Range Gating function

Figure 21:
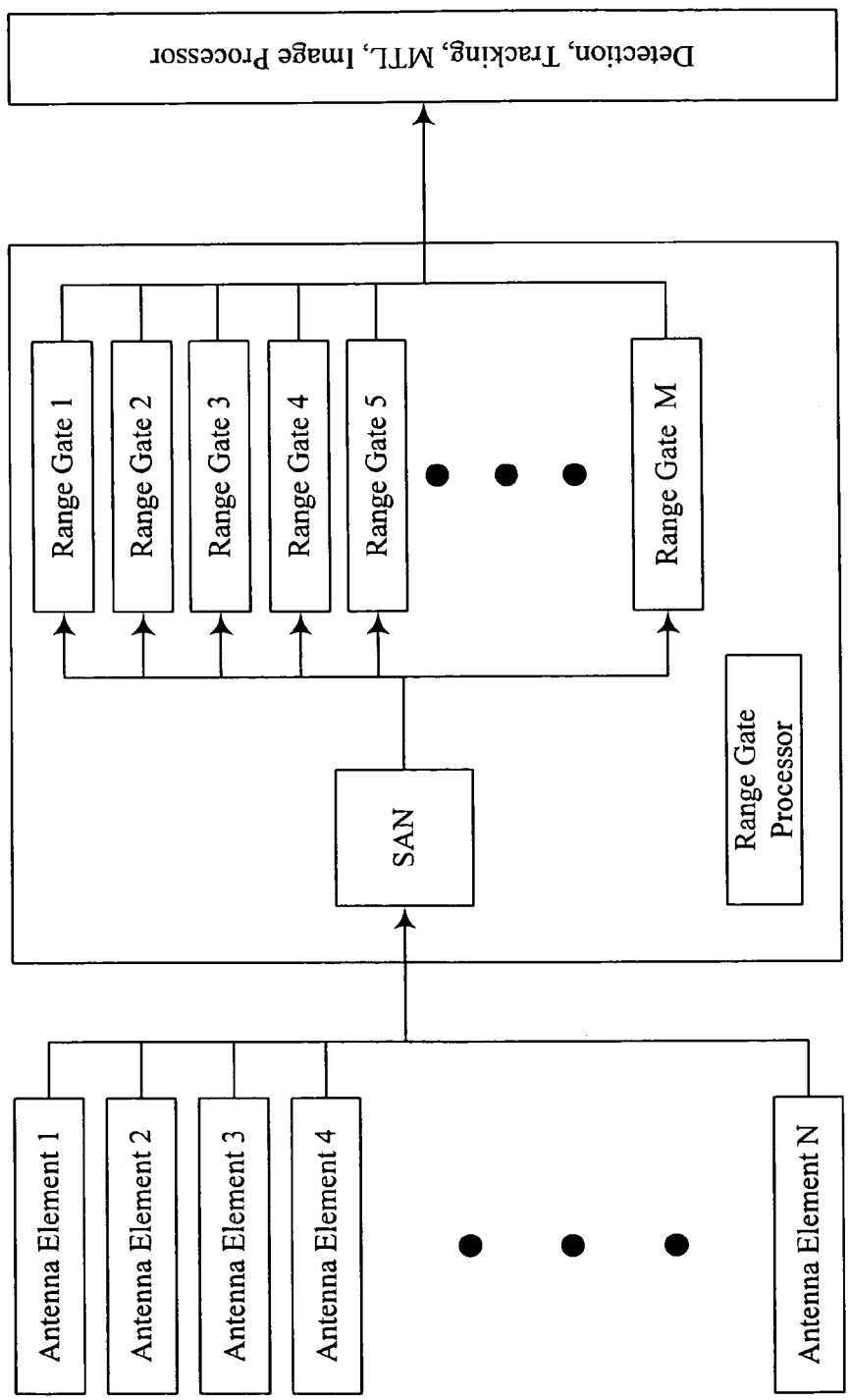
FIG. 21: This figure illustrates the range gate processor architecture.

The range gate implementation scheme is illustrated in FIG. 21.

The major data structures for this mid level architecture are similar to the range gate processor and include the following:
  Input data structure from the lower level architecture modules (Quadrature digital data from the output of the antenna elements (12 to 16 bit ADC out put, 64 bit floating point, time stamp, format compatible with the optical input of the SAN))
  Output data from the SAN to the processors (format compatible with the output of the SAN, input of the processor, Memory interface specific to the buss structure of the processor, processor output format compatible with the specified network protocol (variable)) Processor interface structure is illustrated in FIG. 14)
  Communication data structures compatible with network physical layer, control layer, and protocol layer requirements.
  Navigation Data structure from GPS/INS, compatible with output of both devices The major external interfaces to the beam former module include:
  Data interface to sensor front end
  Data interface to sensor modality processors
  Data interface to the C4I infrastructure
  Data interface to Navigation system The major internal interfaces of the beam former module include the following:
  Memory
  Storage
  Multiprocessor
  Control
  Communication
  Network Critical to future scalability issues is the incorporation of parallel infrastructure in all module components. The SAN, Processor, memory and C4I interfaces require multi module architectures to be expandable. The inherent assumption of parallel architectures for ADC, memory, storage, network and processor components enables future upgrade and scalable performance improvements without system redesign.

Very few technical risks exist with this architecture design. Limited performance item need only be placed in parallel to achieve performance gains. Tradeoff with footprint, power consumption, etc. will force transition solutions to be implemented. Within the foreseeable future technical performance will not be limited by device governing laws.

Clutter Canceller Function

Figure 22:
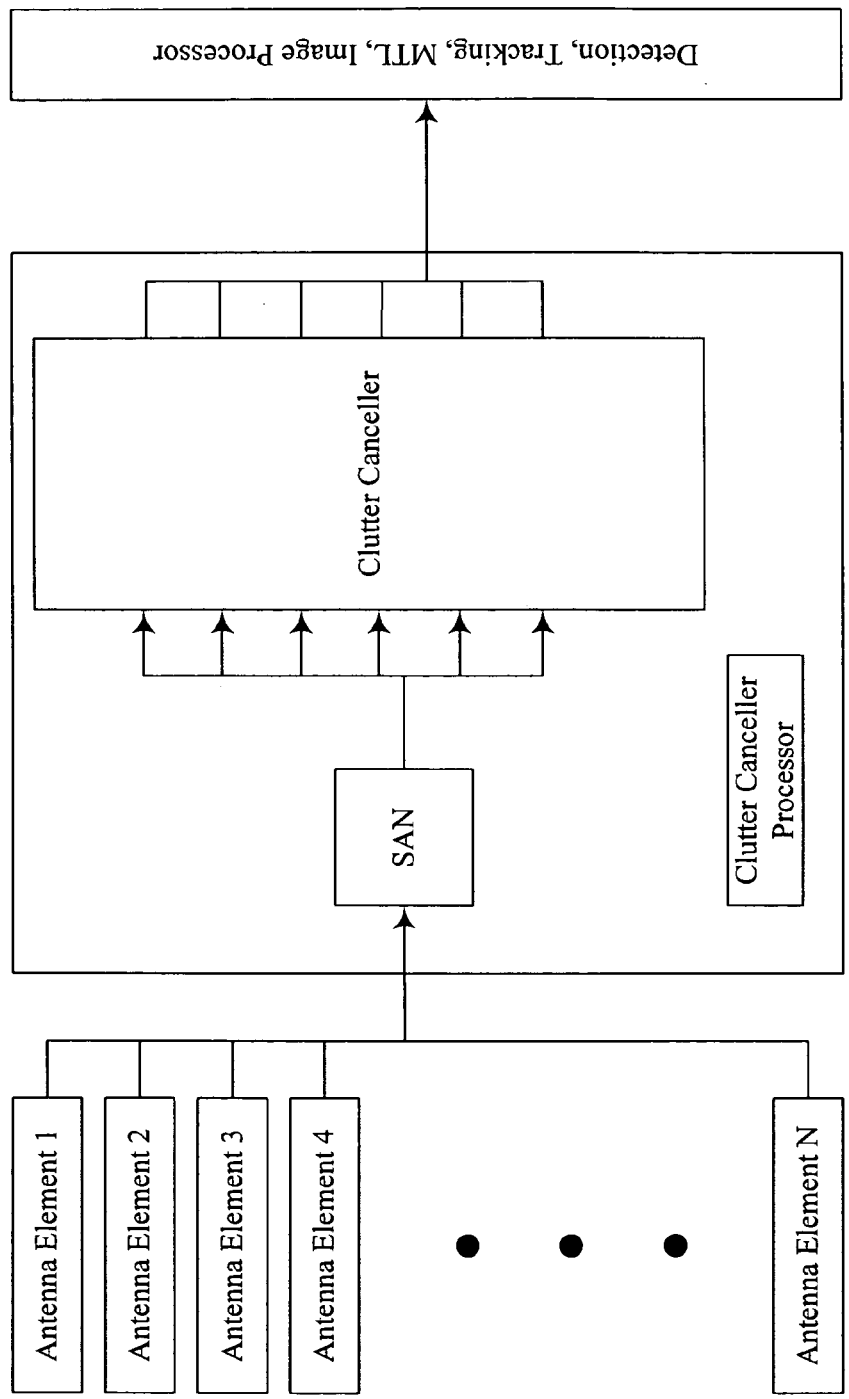
FIG. 22: This figure illustrates clutter canceller architecture.

The clutter processor implementation scheme is illustrated in FIG. 22.

The major data structures for this mid level architecture are similar to the clutter canceller processor and include the following:
  Input data structure from the lower level architecture modules (Quadrature digital data from the output of the antenna elements (12 to 16 bit ADC out put, 64 bit floating point, time stamp, format compatible with the optical input of the SAN))
  Output data from the SAN to the processors (format compatible with the output of the SAN, input of the processor, Memory interface specific to the buss structure of the processor, processor output format compatible with the specified network protocol (variable)) Processor interface structure is illustrated in FIG. 14)
  Communication data structures compatible with network physical layer, control layer, and protocol layer requirements.
  Navigation Data structure from GPS/INS, compatible with output of both devices The major external interfaces to the beam former module include:
  Data interface to sensor front end
  Data interface to sensor modality processors
  Data interface to the C4I infrastructure
  Data interface to Navigation system The major internal interfaces of the beam former module include the following:
  Memory
  Storage
  Multiprocessor
  Control
  Communication
  Network Critical to future scalability issues is the incorporation of parallel infrastructure in all module components. The SAN, Processor, memory and C4I interfaces require multi module architectures to be expandable. The inherent assumption of parallel architectures for ADC, memory, storage, network and processor components enables future upgrade and scalable performance improvements without system redesign.

SAN Infrastructure, Memory, Network Infrastructure, Processor, Communications Infrastructure The major data structures for these mid level architecture are similar and include the following:

I/O data structure

Control data structures

Communication data structures compatible with network physical layer, control layer, and protocol layer requirements.

The major external interfaces to the beam former module include:

Data interface to sensor front end

Data interface to sensor modality processors

Data interface to the C4I infrastructure

Data interface to Navigation system

The major internal interfaces of the beam former module include the following:

Memory

Storage

Multiprocessor

Control

Communication

Network

Critical to future scalability issues is the incorporation of parallel infrastructure in all module components. The SAN, Processor, memory and C4I interfaces require multi-module architectures to be expandable. It is understood that these would be implemented with multiple devices on the same network with access to several processor module functions. The inherent assumption of parallel architectures for ADC, memory, storage, network and processor components enables future upgrade and scalable performance improvements without system redesign.

Figure 23:
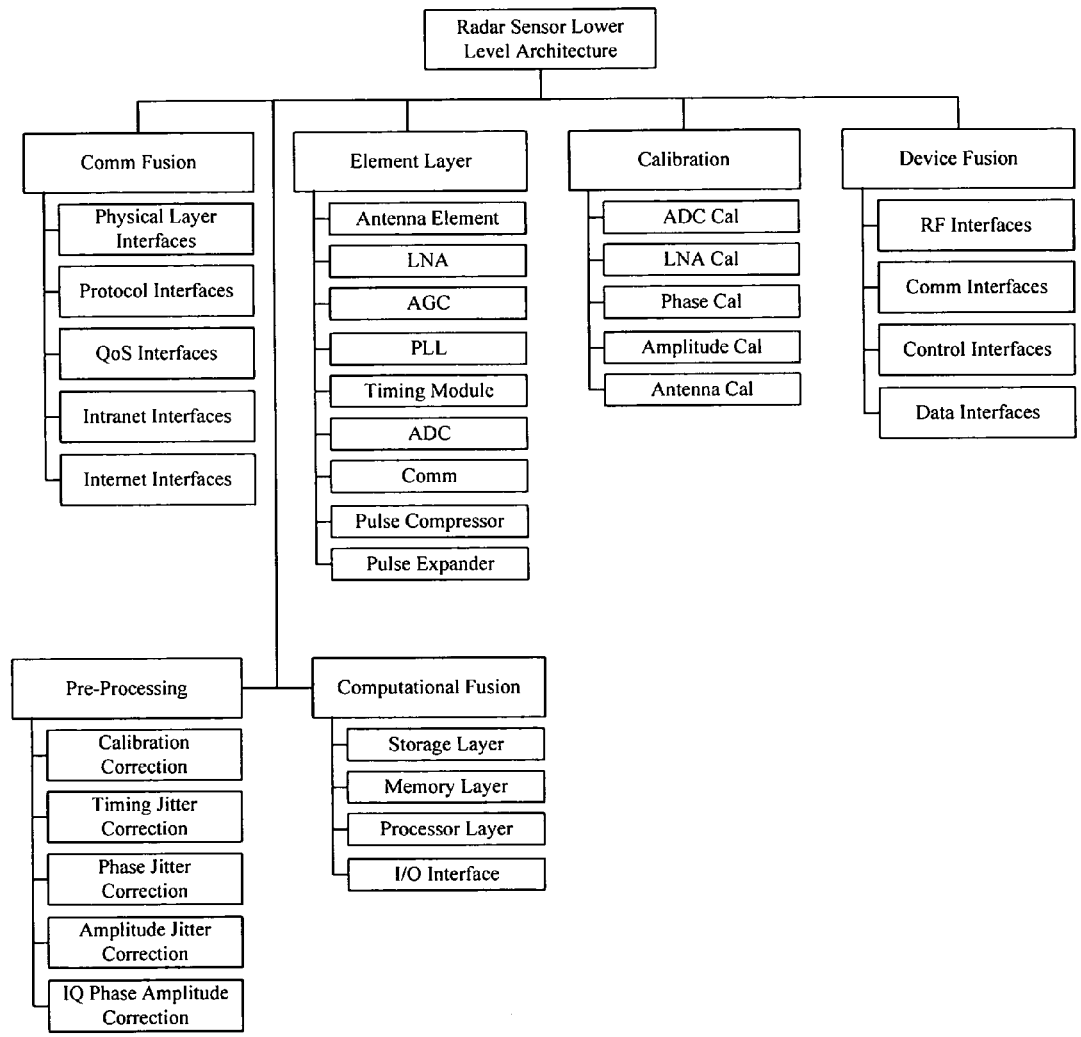
FIG. 23: This figure illustrates lower level system architecture.
Figure 24:
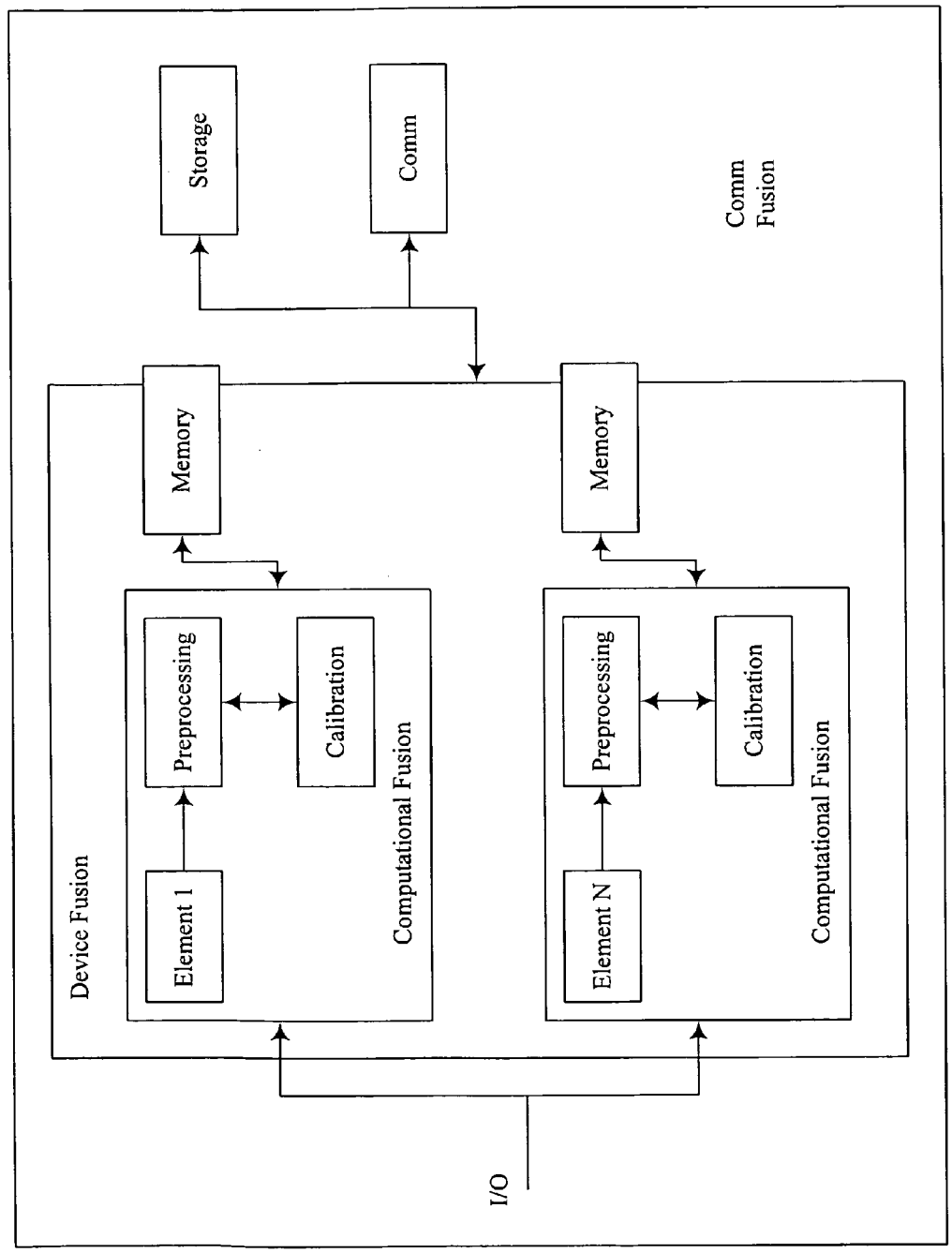
FIG. 24: This figure illustrates the functional requirements of the lower level system architecture.

Lower level system architecture describes the fusion of hardware and software components just above the individual component level. The lower level architecture is illustrated in FIG. 23. Typical lower level subsystems are constructed with individual devices, network interfaces, communication interfaces, computational components, and calibration infrastructure. This layer represents the fusion of hardware components, computational resources, calibration approaches, and any preprocessing required to precondition signals for subsequent operations. A functional block diagram of the lower level architecture is illustrated in FIG. 24. The diagram represents the integration of multiple components within the system. A typical example (but not the sole case) is the integration of individual elements of the transceiver structure. Each of the radiation elements (including front end, mixers, calibration units, ADC's, etc) are connected to processing, calibration, memory or storage elements and external/internal communication infrastructure. The individual components of the process are described in the next sections.

Calibration processes are incorporated throughout the system architecture [19, 20]. Processes are integrated at the appropriate level with in the system to fulfill correction of non-linearity within components, subsystems, and/or overall system transfer functions. All will have interfaces to communication network, access to processor and memory functionality, and interface to C4I infrastructure. The example describes the cross element normalization necessary for the beam forming or steering process. Internal calibration cycles and injection points will occur within elements, within components that comprise elements and at processing points external to the lower level system architecture.

The preprocessing functionality supports a number of signal conditioning requirements throughout the lower level architecture. These include signal conditioning functions (e.g. averaging, noise reduction, estimation, signal statistics, etc.), timing and phase corrections, normalization with the element, as well as across elements, signal routing, storage and memory management, communication and control interfaces, and I/O interface management. Preprocessing functionality tend to support element and component signal processing requirements within components and within element subsystems. Such systems are, dedicated to a specific task, interface to local element networks, respond to limited external control functions, require high computational throughput (e.g. FFT and DSP computational speeds on a pulse to pulse time scale [20, 21].) and consequently are specified with high computational speeds, large local memory and relatively high network bandwidths.

The computational fusion functionality typically takes place external to the element layer with in the lower level system architecture. Computational requirements typically are supported by more genera purpose processors. These computational units are design to integrate all of the computational requirements on individual parallel element subsystems. Within element processing functionality, as well as external element processing requirements are managed at this level. Shared memory, shared storage and shared network and communication functionality are part of the requirements package of computational fusion. Its primary function is computational management and not control, communications or network management. Those functional requirements take place at the device fusion level.

Device fusion functionality integrates subsystem functionality external to the individual elements. This requirement consolidates the multi channel signal inputs and manages the higher-level communication, network, storage, memory, control, and computational demands. The mechanization of this higher-level functionality allows the midlevel architecture to interface, to consolidate information it can use to create system modality. The major attributes of this functional descriptor include, organized storage structure, shared computational and memory resources, organized data format, descriptors, and attributes, structured access protocols, and integrated communication interfaces to the appropriate sensor inter/intra networks.

Communication fusion operates on the system functionality at the interface just below the mid-level system architecture. The major requirement is the integration of all communication functionality from the device level through signal consolidation that takes place at the device fusion level. This fusion process manages physical layer performance, QoS, protocol layer, reprovisioning, traffic, etc. This process allows the communications infrastructure to be transparent to signal flow from the antenna output to final signal consolidation at the end to the lower level system architecture.

Overall system architecture has been designed to be hierarchical, with global infrastructure at the highest level and component functionality at the lowest level. Typically the infrastructure supports the global interfaces of battlefield management to the systems. Bandwidths could include very low to extremely high communication requirements. Generally, system control requirements tend to utilize low bandwidth and information or data transport require high bandwidth conduits. The network components are inherently distributed. Computation components will not reside only in one location, and in some case may be distributed with sensor components as well as computational engines localized at command central. The approach configures resources to optimize functional requirements, information generation, information transfer, system control and configuration, and the allocation of communication resources based on Quality of Service (QoS) requirements and hierarchy. This particular infrastructure will utilize current and future generations of communication interfaces such as distributed fixed based wireless systems, 3 and 4 G wireless constructs, optical and legacy wired infrastructures, etc.

The midlevel architecture level of the system describes system functionality rather than configuration. Once the incoming signal has been digitized, a network of distributed communication and processing hardware and software produces the required transformations. Since this portion of the architecture is mostly communication and processor driven, system upgrades can be included in the architecture design. Requirements at this level will include reconfigurability, resiliency, distributed computational interfaces, computational redundancy and self organization/healing. This architectural level will have interfaces to the upper level and lower level architectural structure. C4I interfaces will include traditional low bandwidth conduits and extremely high bandwidth infrastructure typically at the interface to hardware processors that are required to implement functionality.

The next level of architecture is the lower level. The integration of device, communication and computational resources are included in this lower level descriptor. This level is dominated by high band width communication interfaces that support both processor functionality and communication interfaces. This connectivity takes the form of conventional communications architecture as well as buss-oriented architectures associated with memory and storage interfaces. In some cases, memory and computational resources are shared between devices, communications interfaces and computational structures. This level specifies the fusion between compute, communicate and the individual devices that make up higher level components (e.g. AGC's, LNA.s, ADC's, etc.). Each antenna element has a transceiver pair that is constructed from individual components each of which have compute, communicate and control structures.

The device structures are examples of advanced integrated devices that share a common C4I architecture. Originally, the pulse shaper was a hardware-implemented device with limited flexibility. The pulse shape is tied to the SAW device. The output signal is dictated by the set of design specifications describing the overall structure. System flexibility is severely limited because of the hardware implementation. Because pulse shape cannot be altered without changing the SAW device, multi modal functionality of the system is compromised.

A more generalized functional description of the Pulse Shaper device allows specific output pulse shapes to be realized using lookup tables and mixer functions. Aliased time domain signals can be effectively reduced using filters that are either digitally generated or implemented in real time. A hardware-implemented filter must be tunable and have sufficient RF and control bandwidth (pulse to pulse tunable time constant) to provide adequate blanking of the output RF pulse stream. This functional scheme allows waveform selectivity, multi-modal system performance, and calibration control, to be implemented within the same system architecture.

A more effective architecture implements the entire pulse shaping process in software. Pulse shape, mixing functions, alias filters can be individually controlled. This approach allows multifunction capability, multi-modal behavior, all on a pulse-to-pulse timing scheme. Adaptable system performance is now a real system capability. The concept of full and partial digital system realizations is discussed in the next sections.

With these criteria, the local oscillators can be eliminated, assuming stable RF oscillators for the primary radiated signal. Given digital signal interfaces traditional processing constructs can be implemented on computational engines designed to be flexible, reconfigurable, task driven, with hierarchical Quality of Service (QoS) performance specifications.

The front end typically comprises analog components with fixed performance and control parameters. The STALO and COHO oscillators are included to place the received signal at a center frequency that will allow analog or digital processing (usually in the 60 to 150 MHz range). The approach could replace the front end system with a fully digitized signal stream beginning at the rear of the Low Noise Amplifier (LNA) on the receiver side, and right before the power amplifier on the transmitter side. Realistically, fully-digital implementations will require analog to digital converters with sampling speeds up to 50 GHz and bandwidth approaching 10 GHz (for ultra-wideband systems).

At this level, system design criteria is driven by data through-put, control bandwidth, computational bandwidth, I/O bandwidth, and the ability to implement system functionality on a pulse to pulse timing schedule. The control, communication, and processing architectures easily accommodate parallel realizations to minimize functional bottlenecks. Optimal architecture will minimize parallel structures while maximizing system performance, power efficiency, and flexibility to accommodate future system and component upgrades.

The beam formation process is implemented within the processor and not the antenna front end. The advantage of this scheme is that all beams are formed on a single pulse into the receiver. Conventional architecture (analog with digital beam formers) form high resolution beams on a pulse to pulse basis.

This configuration allows all beams to be phase correlated to the same transmit pulse, and orientation geometry (both target and radar orientation and position). This configuration allows improved SNR, clutter reduction, pulse to pulse multi-target correlation, antenna efficiency and beam formation purity. The entire aperture can be used to form simultaneous multiple beams with subsequent improvement in SNR, side lobe management, etc. all on a single incoming pulse. The trade-off is increased number and complexity of processors.

There are alternative configurations to a fully-digital system. Here a single processor (could consist of multiple devices) forms multiple beams in a sequential fashion. If the output exits the processor within a pulse period then the results are similar to the full digital implementation. This approach has less redundancy but offsets reliability with simpler implementation. If the processor cannot form the beams sufficiently fast, the outputs of the beam former will include multiple beams formed with different transmit pulses, similar to conventional systems where beam directions are formed from different radiated pulses. Again, the difficulty in this implementation is driven by the lack of coherency of the formed beams—from beam to beam (i.e. from pulse to pulse).

The performance of the ADC limits the realization of a full digital architecture concept. Conversion speed, latency, and ADC bandwidth dictate where the analog to digital conversion process in integrated into the system architecture. System performance will be enhanced as ADC speeds and performance improve. Fortunately, this architecture concept allows upgrade without major system redesign. The concept uses processor-derived clocks to generate the local oscillator inputs (with suitable drive amplifiers), and moves the IF processing frequency to a band where the ADC performance is optimized. As ADC performance improves (sampling speed and bandwidth), the IF frequency can be migrated to the RF. Overall configuration does not change, architectural design remains consistent with overall design requirements, and the system configuration migrates to the fully digital concept. In this configuration, both IF inputs are processor controlled.

What is claimed is:

1. A method of organizing a radar or any RF, acoustic, optical, etc sensor system using self-similar hierarchical levels comprising:
    identifying a global system organizational layer or level that comprises a structure that includes command, control, communication, and computational or processor elements,
    identifying more than one subordinate organizational layer or level that has analogous elements to said global system layer or level,
    defining and assigning C4I functional processes, configuration characteristics, or performance characteristics for each said subordinate organizational layer or level, and where said processes are implemented, either as hardware or software, by structural units, or modules, comprising components, sensors, and devices, or assemblies thereof, and
    defining and specifying interface requirements between each neighboring said subordinate organizational layer or level.

2. The method according to claim 1, wherein said component is selected from the following group: radiofrequency, optical, acoustic and electronic components, for use in the implementation of the system.

3. The method according to claim 1, wherein said sensor is selected from the following group: an optical, acoustic, electromagnetic, radar, or thermal sensor.

4. The method according to claim 1, wherein said device is selected from the following group: radio frequency, optical, acoustic and electronic components, for use in the implementation of the subsystem.

5. A radar or sensor system having a hierarchical organizational scheme comprising:
    a global system organizational layer or level having a structure, said structure comprising command, control, communication, and computational or processor elements, said structure further comprising more than one subordinate organizational layer or level that has analogous elements to the global system layer, with an infrastructure that permits communications between neighboring subordinate organizational levels.

6. The radar or sensor system according to claim 5, further comprising scalability in the system architecture without redesign of the system organization.

7. A sensor system or radar system according to claim 5, wherein said hierarchical levels or layers comprise an upper, middle, and lower level.

8. A sensor system or radar system according to claim 5 wherein said hierarchical levels or layers comprise upper, middle, lower and component levels.

* * * * *